United States Patent
Jang et al.

(10) Patent No.: US 12,422,647 B2
(45) Date of Patent: Sep. 23, 2025

(54) OPTICAL IMAGING SYSTEM

(71) Applicant: Samsung Electro-Mechanics Co., Ltd., Suwon-si (KR)

(72) Inventors: Dong Hyuk Jang, Suwon-si (KR); Byung Hyun Kim, Suwon-si (KR); Jae Hyuk Huh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 265 days.

(21) Appl. No.: 17/158,192

(22) Filed: Jan. 26, 2021

(65) Prior Publication Data

US 2022/0091372 A1 Mar. 24, 2022

(30) Foreign Application Priority Data

Sep. 18, 2020 (KR) .......................... 10-2020-0120653

(51) Int. Cl.
*G02B 13/00* (2006.01)
*G02B 27/00* (2006.01)
*H04N 23/55* (2023.01)

(52) U.S. Cl.
CPC ....... *G02B 13/004* (2013.01); *G02B 27/0025* (2013.01); *H04N 23/55* (2023.01)

(58) Field of Classification Search
CPC ...... G02B 13/00; G02B 27/00; G02B 13/004; G02B 13/0045; G02B 13/005; G02B 15/144105; G02B 15/145105; G02B 27/0025; G02B 17/0856; G02B 17/0808; G02B 13/0015; G02B 13/0055; G02B 13/0065; G02B 3/0087; G02B 5/08; G02B 2003/0093; G02B 9/34; G02B 9/60; G02B 13/18; G02B 17/08; G02B 3/00; H04N 23/55; G03B 17/12
USPC ....... 359/715, 714, 708, 726, 727, 728, 729, 359/734, 746, 747, 773
See application file for complete search history.

(56) References Cited

U.S. PATENT DOCUMENTS

| | | | |
|---|---|---|---|
| 6,169,637 B1 * | 1/2001 | Tsunashima | G02B 17/086 359/732 |
| 8,254,038 B2 | 8/2012 | Togino | |
| 8,965,193 B1 | 2/2015 | Svec et al. | |
| 10,877,244 B1 * | 12/2020 | Chen | G02B 13/0015 |

(Continued)

FOREIGN PATENT DOCUMENTS

| CN | 101688970 A | 3/2010 |
|---|---|---|
| CN | 106908936 A | 6/2017 |

(Continued)

OTHER PUBLICATIONS

English translation of JP-WO2014132796 (year. 2017) (Year: 2017).*

(Continued)

*Primary Examiner* — Thomas K Pham
*Assistant Examiner* — Kuei-Jen L Edenfield
(74) *Attorney, Agent, or Firm* — NSIP Law

(57) ABSTRACT

An optical imaging system includes four or more lenses disposed in order from an object side. Among the lenses, a frontmost lens disposed to be closest to an object side has two or more reflective surfaces. Among the lenses, a rearmost lens disposed to be closest to an image side has an inflection point formed on at least one of an object-side surface and an image-side surface.

16 Claims, 16 Drawing Sheets

(56) References Cited

U.S. PATENT DOCUMENTS

| | | |
|---|---|---|
| 11,137,576 B2 | 10/2021 | Kuo |
| 2009/0185153 A1 | 7/2009 | Epple |
| 2010/0110564 A1* | 5/2010 | Togino ............... A61B 1/00177 |
| | | 359/725 |
| 2011/0141581 A1 | 6/2011 | Lee |
| 2016/0170185 A1 | 6/2016 | Kim |
| 2016/0274337 A1 | 9/2016 | Lee |
| 2019/0187446 A1 | 6/2019 | Dai et al. |
| 2020/0012078 A1* | 1/2020 | Kuo ........................ G02B 9/64 |
| 2021/0396979 A1* | 12/2021 | Nitta ..................... G02B 13/18 |
| 2023/0221537 A1* | 7/2023 | Chen ................... G02B 13/007 |

FOREIGN PATENT DOCUMENTS

| | | | | |
|---|---|---|---|---|
| CN | 110687659 A | | 1/2020 | |
| CN | 111367042 A | | 7/2020 | |
| JP | 2011227362 A | * | 11/2011 | ........... G02B 13/004 |
| JP | WO2014132796 | * | 9/2014 | |
| JP | 6308208 B2 | | 4/2018 | |
| KR | 20-0182878 Y1 | | 5/2000 | |
| KR | 10-2011-0068108 A | | 6/2011 | |
| KR | 10-2013-0037883 A | | 4/2013 | |
| KR | 10-2016-0071304 A | | 6/2016 | |
| KR | 10-2020-0037938 A | | 4/2020 | |
| TW | 201732443 A | | 9/2017 | |
| WO | WO-2014132796 A1 | * | 9/2014 | ......... G02B 13/0045 |
| WO | WO-2017159950 A1 | * | 9/2017 | ............... A42B 3/04 |

OTHER PUBLICATIONS

"OHARA GmbH","ohara glass catalog" Jun. 2003 : http://www.rdphotonics.com/upfiles/file/OHARA.pdf (Year: 2003).*
English translation of JP-2011227362-A, (Nov. 10, 2011) (Year: 2011).*
English translation of WO-2014132796, (Sep. 4, 2014) (Year: 2014).*
English Translation of WO2017159950 (Year: 2017).*
Taiwanese Office Action issued on Nov. 3, 2021, in counterpart Taiwanese Patent Application No. 110104258 (5 pages in English and 5 pages in Mandarin).
Korean Office Action issued on Jan. 21, 2022, in counterpart of Korean Patent Application No. 10-2020-0120653 (8 pages in English and 6 pages in Korean).
Taiwanese Office Action issued on Feb. 3, 2023, in counterpart Taiwanese Patent Application No. 111129044 (4 pages in English, 5 pages in Chinese).
Korean Office Action issued on Sep. 7, 20223 in corresponding Korean Patent Application No. 10-2022-0042778 (7 pages in English, 6 pages in Korean).
Chinese Office Action issued on Feb. 29, 2024, in counterpart Chinese Patent Application No. 202110549826.3 (4 pages in English, 9 pages in Chinese).
Chinese Office Action issued on Dec. 9, 2024, in Counterpart Chinese Patent Application No. 202110549826.3 (7 Pages in English, 10 Pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2020-0120653 filed on Sep. 18, 2020, in the Korean Intellectual Property Office, the entire disclosure of which is incorporated herein by reference for all purposes.

BACKGROUND

1. Field

The present disclosure relates to an optical imaging system configured to image a long-range object.

2. Description of the Background

A small-sized optical imaging system, mounted in a portable terminal device, is configured to be appropriate for capturing an image of a short-range object. Therefore, it may be difficult for the small-sized optical imaging system to capture an image of a long-range object. Some small-sized optical imaging systems are configured to be appropriate for capturing an image of a long-range object. However, due to a limitation in mounting space of a portable terminal device, it may be difficult to capture an image of an object, disposed at a great distance, at high resolution.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes four or more lenses disposed in order from an object side. Among the lenses, a frontmost lens disposed to be closest to an object side has two or more reflective surfaces. Among the lenses, a rearmost lens disposed to be closest to an image side has an inflection point formed on at least one of an object-side surface and an image-side surface.

The frontmost lens may have a concave image-side surface.

The rearmost lens may have a concave object-side surface.

The rearmost lens may have a concave image-side surface.

The frontmost lens may have positive refractive power.

The rearmost lens may have negative refractive power.

TTL/f may be greater than 0.28 and less than 0.32, where TTL is a distance from an object-side surface of the frontmost lens to an imaging plane, and f is a focal length of the optical imaging system.

f/f1 may be greater than 1.0 and less than 2.0, where f is a focal length of the optical imaging system, and f1 is a focal length of the frontmost lens.

L1S1ER/L1S2ER may be greater than 4.30 and less than 5.80, where L1S1ER is an effective radius of an object-side surface of the frontmost lens, and L1S2ER is an effective radius of an image-side surface of the frontmost lens.

In another general aspect, an optical imaging system includes a first lens, a second lens having negative refractive power, a third lens, and a fourth lens, disposed in order from an object side, wherein the first lens has a first reflective surface, configured to reflect light incident from an object-side surface of the first lens, and a second reflective surface configured to reflect the light, reflected by the first reflective surface, to an image-side surface of the first lens.

The first lens may have positive refractive power.

The third lens may have positive refractive index.

The optical imaging system may further include a fifth lens disposed to an image side of the fourth lens.

The fifth lens may have negative refractive power.

An inflection point may be formed on an object-side surface or an image-side surface of the fifth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
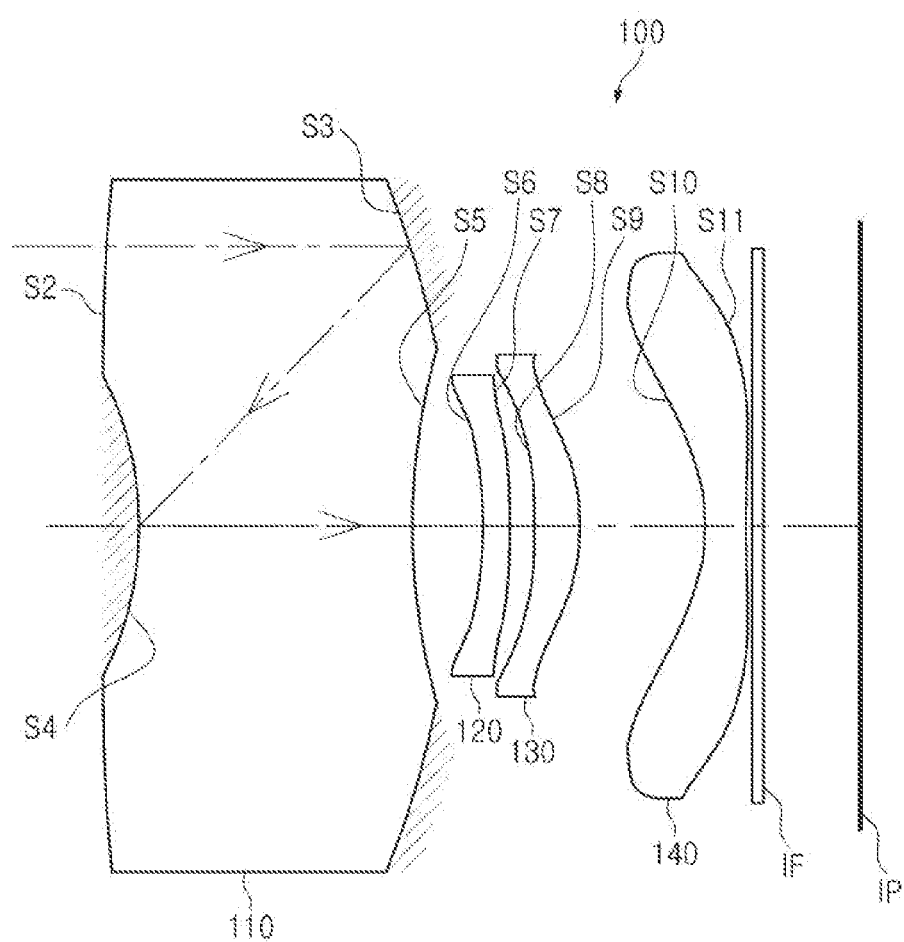
FIG. 1 is a diagram illustrating a first example of an optical imaging system.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide an optical imaging system which may be mounted on a portable terminal device and may implement a high telephoto ratio.

An optical imaging system includes a plurality of lenses disposed along an optical axis. The plurality of lenses may be spaced apart from each other by predetermined distances along the optical axis.

For example, the optical imaging system includes a first lens, a second lens, a third lens, a fourth lens, a fifth lens, and a sixth lens sequentially disposed in ascending numerical order along the optical axis from an object side of the optical imaging system toward an imaging plane of the optical imaging system, with the first lens being closest to the object side of the optical imaging system and the sixth lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

In the examples, a first lens refers to a lens most adjacent to an object (or a subject), and a sixth lens refers to a lens most adjacent to an imaging plane (or an image sensor). In the examples, units of a radius of curvature, a thickness, a TTL (a distance from an object-side surface of a first lens (or a frontmost lens) to an imaging plane), an IMGHT (one-half of a diagonal length of an imaging plane), and a focal length are indicated in millimeters (mm). A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave.

Similarly, even when it is described that one surface of a lens is concave, an edge of the lens may be convex.

An optical imaging system according to an example may be configured to be miniaturized and to capture an image of a long-range object. For example, the optical imaging system may include a lens having a plurality of reflective surfaces and a lens on which an inflection point is formed. A lens, having a reflective surface, may be disposed to be closest to an object side (hereinafter referred to as a frontmost lens) and a lens, on which an inflection point is formed, may be disposed to be closest to an imaging plane (hereinafter referred to as a rearmost lens).

The frontmost lens may have refractive power. For example, the frontmost lens may have positive refractive power. One surface of the frontmost lens may concave. For example, the frontmost lens may have a concave image-side surface. The rearmost lens may have refractive power. For example, the rearmost lens may have negative refractive power. One surface of the rearmost lens may be concave. For example, the rearmost lens may have a concave object-side surface. As another example, the rearmost lens may have a concave image-side surface. An inflection point may be formed on the rearmost lens. For example, an inflection point may be formed on at least one of an object-side surface and an image-side surface of the rearmost lens.

An optical imaging system according to another example may include four or five lenses disposed in order from an object-side surface to an imaging plane. For example, the optical imaging system may include a first lens, a second lens, a third lens, and a fourth lens disposed in order, or a first lens, a second lens, a third lens, a fourth lens, and a fifth lens disposed in order. The first to fourth lenses or the first to fifth lenses may be disposed at predetermined intervals. For example, a predetermined interval may be formed between the image-side surface of the first lens and the object-side surface of the second lens.

The first lens may have refractive power. For example, the first lens may have positive refractive power. One surface of the first lens may be concave. For example, the first lens may have a concave image-side surface. The first lens may have both a spherical surface and an aspherical surface. For example, the object-side surface of the first lens may be a spherical surface, and the image-side surface of the first lens may be an aspherical surface. The first lens may be formed of a material having high light transmissivity and excellent workability. For example, the first lens may be manufactured using of a plastic material. However, the material of the first lens is not limited to the plastic material. For example, the first lens may be manufactured using a glass material. The first lens may have a predetermined refractive index. For example, the refractive index of the first lens may be greater than 1.6 to less than 1.8. The first lens may have a predetermined focal length. For example, the focal length of the first lens may be selected within the range of 14 to 22 mm.

The first lens may include two or more reflective surfaces. For example, the first lens may have a first reflective surface, reflecting light incident from the object-side surface of the first lens, and a second reflective surface reflecting light, reflected by the first reflective surface, to the image-side surface of the first lens. The first reflective surface and the second reflective surface may be formed as curved surfaces. For example, the first reflective surface may be concave, and the second reflective surface may be convex. The first reflective surface and the second reflective surface may be formed in a certain region of the first lens. For example, the first reflective surface may be formed in an edge region, except for an optical axis region or a paraxial region of the image-side surface of the first lens, and the second reflective surface may be formed in an optical axis region or a paraxial region of the object-side surface of the first lens.

The second lens may have refractive power. For example, the second lens may have negative refractive power. One surface of the second lens may be concave. For example, the second lens may have a concave object-side surface. The second lens may have an aspherical surface. For example, an object-side surface and an image-side surface of the second lens may be aspherical surfaces. The second lens may be formed of a material having high light transmissivity and excellent workability. For example, the second lens may be manufactured using a plastic material. However, the material of the second lens is not limited to the plastic material. For example, the second lens may be manufactured using a glass material. The second lens may have a predetermined refractive index. For example, the refractive index of the second lens may be greater than 1.6 to less than 1.7. The second lens may have a predetermined focal length. For example, the focal length of the second lens may be selected within the range of −16 mm to −3.0 mm.

The third lens may have refractive power. For example, the third lens may have positive refractive power. One surface of the third lens may be convex. For example, the third lens may have a convex image-side surface. The third lens may have an aspherical surface. For example, an object-side surface and an image-side surface of the third lens may be aspherical surfaces. The third lens may be formed of a material having high light transmissivity and excellent workability. For example, the third lens may be formed of a plastic material. However, the material of the third lens is not limited to the plastic material. For example, the third lens may be manufactured using a glass material. The third lens may have a predetermined refractive index. For example, the refractive index of the third lens may be greater than 1.5 to less than 1.65. The third lens may have a predetermined focal length. For example, the focal length of the third lens may be selected within the range of 4.0 mm to 8.0 mm.

The fourth lens may have refractive power. For example, the fourth lens may have positive refractive power or negative refractive power. The fourth lens has a concave shape. For example, the fourth lens may have a concave object-side surface or an image-side surface. The fourth lens may have an aspherical surface. For example, an object-side surface and an image-side surface of the fourth lens may be aspherical surfaces. An inflection point may be formed on the fourth lens. For example, an inflection point may be formed on at least one of the object-side surface and the image-side surface of the fourth lens. The fourth lens may be formed of a material having high light transmissivity and excellent workability. For example, the fourth lens may be manufactured using a plastic material. However, the material of the fourth lens is not limited to the plastic material. For example, the fourth lens may be manufactured using a glass material. The fourth lens may have a predetermined refractive index. For example, the refractive index of the fourth lens may be greater than 1.5 to less than 1.6. The fourth lens may have a predetermined focal length. For example, the focal length of the fourth lens having positive refractive power may be selected within the range of 30 mm to 120 mm, and the focal length of the fourth lens having negative refractive power may be selected within the range of −500 mm to −2.0 mm.

The optical imaging system may further include a fifth lens disposed on the image-side surface of the fourth lens, as necessary. The fifth lens, optionally included, may have the following characteristics.

The fifth lens may have refractive power. For example, the fifth lens may have negative refractive power. One surface of the fifth lens may be concave. For example, the fifth lens may have a concave object-side surface. The fifth lens may have an aspherical surface. For example, an object-side surface and an image-side surface of the fifth lens may be aspherical surfaces. An inflection point may be formed on the fifth lens. For example, an inflection point may be formed on at least one of the object-side surface and the image-side surface of the fifth lens. The fifth lens may be formed of a material having high light transmissivity and excellent workability. For example, the fifth lens may be manufactured using a plastic material. However, the material of the fifth lens is not limited to the plastic material. For example, the fifth lens may be manufactured using a glass material. The fifth lens may have a predetermined refractive index. For example, the refractive index of the fifth lens may be greater than 1.5 to less than 1.6. The fifth lens may have a predetermined focal length. For example, the focal length of the fifth lens may be selected within the range of −5.0 mm to −2.0 mm.

As described above, each of the first to fifth lenses may have an aspherical surface. For example, at least one surface of the first to sixth lenses may be aspherical. An aspherical surface of each of the first to sixth lenses may be represented by Equation 1 as below:

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \quad \text{(Equation 1)}$$

In equation 1, "c" is an inverse of a radius of a curvature of a respective lens, "k" is a conic constant, "r" is a distance from a certain point on an aspherical surface of the lens to an optical axis, "A" to "H" and "J" are aspheric constants, "Z" (or SAG) is a height from a certain point on an aspherical surface to an apex of the aspherical surface in an optical axis direction.

The optical imaging system may further include a stop. The stop may be disposed in front of the first lens, between the first lens and the second lens, or the like.

The optical imaging system may further include a filter. The filter may block some wavelengths from incident light, incident through the first to fourth lenses. For example, the filter may block infrared wavelengths of the incident light.

The optical imaging system may further include an image sensor. The image sensor may provide an imaging plane on which light, refracted by the lenses, may be imaged. For example, a surface of the image sensor may form an imaging plane. The image sensor may be configured to implement high resolution. The imaging plane of the image sensor may have a predetermined size.

The optical imaging system may be configured to increase an optical path without increasing overall length of the imaging optical imaging system. For example, the first lens may form an optical path having a significant length. For example, the first lens may form a first optical path connecting the first reflective surface from the object-side surface of the first lens, a second optical path connecting the second reflective surface from the first reflective surface, and a third optical path connecting the imaging plane of the first lens from the second reflective surface. An optical path, formed by the first lens, may be longer than a distance from the object-side surface to the imaging plane of the first lens.

The above-configured optical imaging system may increase a telephoto ratio without increasing the number of lenses or increasing a distance between lenses. Thus, the optical imaging system may be easily mounted on a small-sized camera module and a thin portable terminal device having a small thickness.

The optical imaging system according to an example may satisfy one or more of the following conditional expressions.

$0.28 < TTL/f < 0.32$ $1.0 < f/f1 < 2.0$ $0 < V1 - V2 < 30$ $3.14 < Nd2 + Nd3 < 3.40$ $0.02 < BFL/f < 0.25$ $0.001 < D12/f < 0.04$ $2.3 < f\text{ number}$ In the above conditional equations, TTL is a distance from an object-side surface of a first lens (or a frontmost lens) to an imaging plane of the optical imaging system, f is a focal length of the imaging optical imaging system, f1 is a focal length of the first lens (or the frontmost lens), and V1 is an Abbe number of the first lens, V2 is an Abbe number of a second lens, Nd2 is a refractive index of the second lens, Nd3 is a refractive index of a third lens, and BFL is a distance from an image-side surface of a lens, closest to the imaging plane, to the imaging plane, and D12 is a distance from an image-side surface of the first lens to an object-side surface of the second lens.

The optical imaging system may further satisfy one or more of the following conditional expressions.

$4.30 < L1S1ER/L1S2ER < 5.80$ $1.1 < L1TL/TTL < 1.3$

In the above conditional equations, L1S1ER is an effective radius of the object-side surface of the first lens (or the frontmost lens), L1S2ER is an effective radius of the image-side surface of the first lens (or the frontmost lens), L1TL is the sum of a distance from the object-side surface of the first lens (or the frontmost lens) to the first reflective surface, a distance from the first reflective surface to the second reflective surface, and a distance from the second reflective surface to the imaging plane of the optical imaging system.

In the description below, various examples of an optical imaging system will be described.

Hereinafter, an optical imaging system 100 according to a first example will be described with reference to FIG. 1.

The optical imaging system 100 may include a plurality of lenses, each having refractive power. For example, the optical imaging system 100 may include a first lens 110, a second lens 120, a third lens 130, and a fourth lens 140. The first to fourth lenses 110 to 140 may be disposed at intervals in order from the object-side surface.

The first lens 110 may have positive refractive power, and may have a convex object-side surface around, but not including, the paraxial region, and a concave image-side surface. The second lens 120 may have negative refractive power, and may have a concave object-side surface and a convex image-side surface. The third lens 130 may have positive refractive power, and may have a concave object-side surface and a convex image-side surface. The fourth lens 140 may have negative refractive power, and may have a concave object-side surface and a concave image-side surface. Inflection points may be formed on the object-side surface and the image-side surface of the fourth lens 140.

The first lens 110 is configured to have an optical path having a significant length (as used herein, a significant length refers to a relatively long length). For example, the optical path of the first lens 110 may include a first optical path connecting a first reflective surface S3 from an object-side surface S2, a second optical path connecting a second reflective surface S4 from the first reflective surface S3, and a third optical path connecting an image-side surface S5 from the second reflective surface S4. The optical path having a significant length as described herein may be longer relative to a comparative optical path directly connecting an image-side surface from an object-side surface. Thus, the optical imaging system 100 according to the first example may secure a significant optical path required for long-range image capturing through the first lens 110.

The optical imaging system 100 may include a filter IF. For example, the filter IF may be disposed between the fourth lens 140 and the imaging plane IP. The filter IF may be configured to block infrared light.

Figure 2:
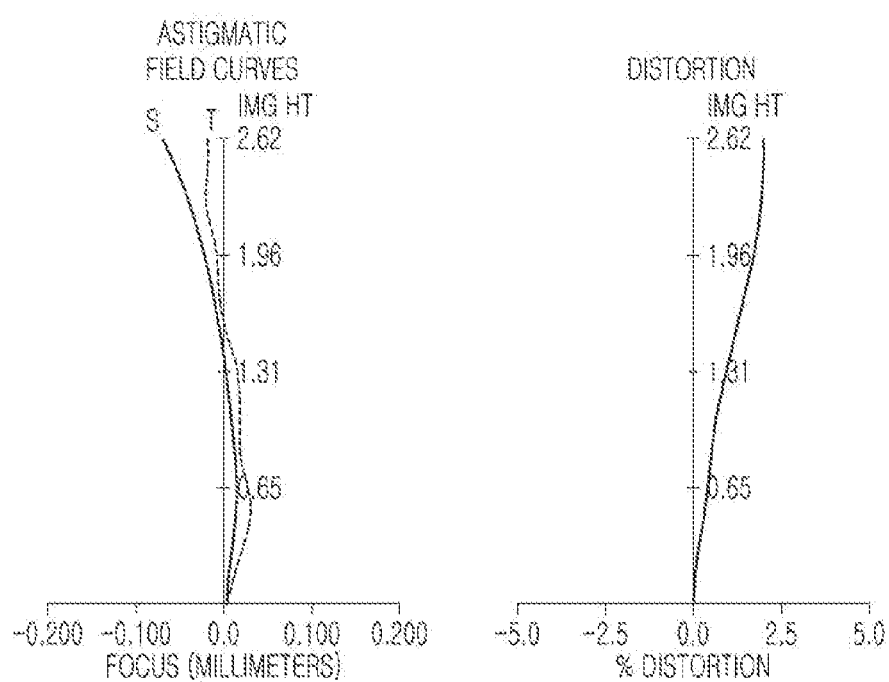
FIG. 2 is a view illustrating aberration curves of the optical imaging system illustrated in FIG. 1.

The optical imaging system 100 according to the first example exhibits aberration characteristics as illustrated in FIG. 2. Lens characteristics of the optical imaging system 100 according to the first example are listed in Table 1.

TABLE 1

| Surface No. | Note | Radius of Curvature | Thickness/ Distance | Refractive Index | Abbe Number | Effective Radius |
|---|---|---|---|---|---|---|
| S1 | Stop | Infinity | 0 | | | |
| S2 | First Lens | 692.186 | 3.253 | 1.743 | 49.200 | 3.071 |
| S3 | | −8.151 | −2.907 | | | 3.222 |
| S4 | | −2.796 | 2.521 | | | 1.172 |
| S5 | | 5.600 | 0.650 | | | 1.202 |
| S6 | Second Lens | −4.371 | 0.250 | 1.614 | 25.900 | 1.240 |
| S7 | | −13.653 | 0.226 | | | 1.336 |
| S8 | Third Lens | −15.480 | 0.418 | 1.535 | 56.100 | 1.380 |
| S9 | | −2.224 | 1.156 | | | 1.506 |
| S10 | Fourth Lens | −1.938 | 0.380 | 1.535 | 56.100 | 2.202 |
| S11 | | 8.074 | 0.052 | | | 2.415 |
| S12 | Filter | Infinity | 0.110 | 1.518 | 64.166 | 2.563 |
| S13 | | Infinity | 0.894 | | | 2.582 |
| S14 | Imaging Plane | Infinity | −0.004 | | | 2.825 |

Aspherical characteristic of the optical imaging system 100 according to the first example are listed in Table 2.

TABLE 2

| Surface No. | S3 | S4 | S5 | S6 | S7 |
|---|---|---|---|---|---|
| K | −1.98438 | −4.46805 | 17.58966 | 5.60059 | 18.07816 |
| A | −0.00019 | −0.00826 | 0.00634 | −0.00359 | −0.12073 |
| B | 0.00000 | 0.00223 | −0.02247 | −0.04706 | 0.07956 |
| C | 0.00000 | 0.00008 | 0.00010 | 0.13303 | 0.13798 |
| D | 0.00000 | −0.00052 | −0.00244 | −0.30318 | −0.61674 |
| E | 0.00000 | 0.00026 | 0.00000 | 0.41246 | 1.03964 |
| F | 0.00000 | 0.00000 | 0.00000 | −0.34954 | −0.96024 |
| G | 0.00000 | −0.00003 | 0.00000 | 0.18084 | 0.50858 |
| H | 0.00000 | −0.00001 | 0.00000 | −0.05025 | −0.14368 |
| J | 0.00000 | 0.00001 | 0.00000 | 0.00561 | 0.01663 |

TABLE 2-continued

| Surface No. | S8 | S9 | S10 | S11 |
|---|---|---|---|---|
| K | −99.00000 | −3.89868 | −1.25121 | −84.72912 |
| A | −0.21125 | −0.07617 | −0.05314 | −0.08411 |
| B | 0.01598 | −0.12887 | 0.06040 | 0.06993 |
| C | 0.58053 | 0.55151 | −0.00314 | −0.04462 |
| D | −1.43860 | −0.93894 | −0.02418 | 0.02016 |
| E | 1.89184 | 0.97381 | 0.01655 | −0.00657 |
| F | −1.47018 | −0.63450 | −0.00525 | 0.00147 |
| G | 0.67185 | 0.25311 | 0.00091 | −0.00021 |
| H | −0.16634 | −0.05646 | −0.00008 | 0.00002 |
| J | 0.01710 | 0.00539 | 0.00000 | 0.00000 |

Figure 3:
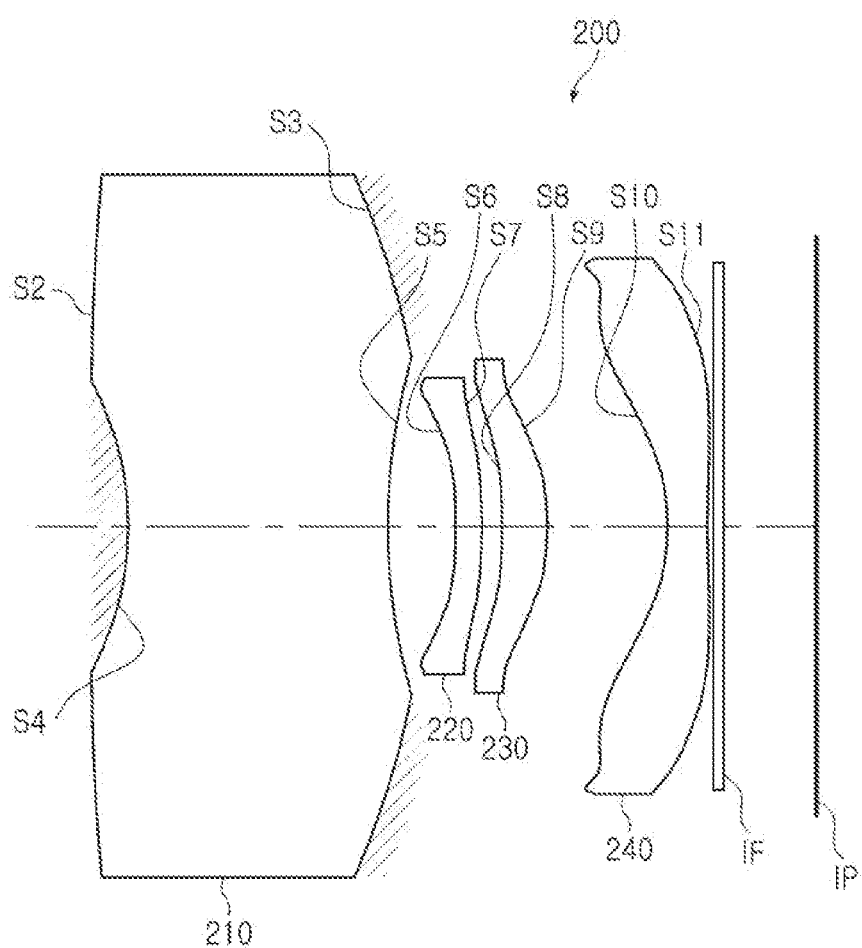
FIG. 3 is a diagram illustrating a second example of an optical imaging system.

Hereinafter, an optical imaging system 200 according to a second example will be described with reference to FIG. 3.

The optical imaging system 200 may include a plurality of lenses, each having refractive power. For example, the optical imaging system 200 may include a first lens 210, a second lens 220, a third lens 230, and a fourth lens 240. The first to fourth lenses 210 to 240 may be disposed in order from an object side at intervals.

The first lens 210 may have positive refractive power, may have a convex object-side surface around, but not including, the paraxial region, and a concave image-side surface. The second lens 220 may have negative refractive power, and may have a concave object-side surface and a convex image-side surface. The third lens 230 may have positive refractive power, and may have a concave object-side surface and a convex image-side surface. The fourth lens 240 may have negative refractive power, and may have a concave object-side surface and a concave image-side surface. Inflection points may be formed on the object-side surface and the image-side surface of the fourth lens 240.

The first lens 210 may be configured to have an optical path having a significant length. For example, the optical path of the first lens 210 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 200 according to the second example may secure a significant optical path required for long-range image capturing through the first lens 210.

The optical imaging system 200 may include a filter IF. For example, the filter IF may be disposed between the fourth lens 240 and the imaging plane IP. The filter IF may be configured to block infrared light.

Figure 4:
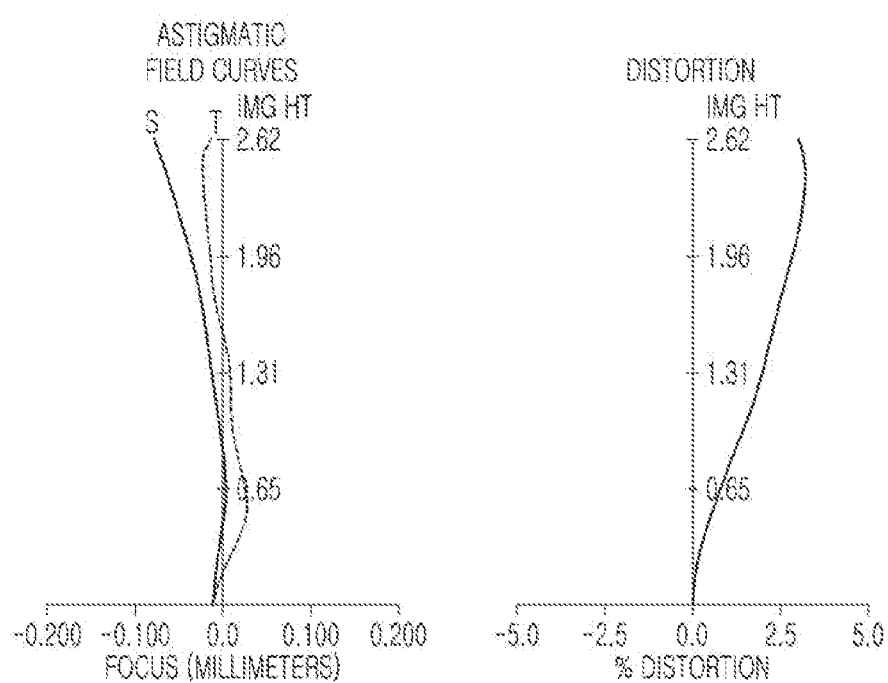
FIG. 4 is a view illustrating aberration curves of the optical imaging system illustrated in FIG. 3.

The optical imaging system 200 according to the second example exhibits aberration characteristics as illustrated in FIG. 4. Lens characteristics of the optical imaging system 200 according to the second example are listed in Table 3.

TABLE 3

| Surface No. | Note | Radius of Curvature | Thickness/ Distance | Refractive Index | Abbe Number | Effective Radius |
| --- | --- | --- | --- | --- | --- | --- |
| S1 | Stop | Infinity | 0.000 | | | |
| S2 | First Lens | 764.576 | 3.253 | 1.640 | 23.500 | 3.285 |
| S3 | | −8.137 | −2.907 | | | 3.436 |
| S4 | | −2.797 | 2.521 | | | 1.257 |
| S5 | | 5.572 | 0.650 | | | 1.231 |
| S6 | Second Lens | −3.931 | 0.250 | 1.661 | 20.400 | 1.250 |
| S7 | | −10.212 | 0.194 | | | 1.358 |
| S8 | Third Lens | −14.097 | 0.446 | 1.535 | 56.100 | 1.407 |
| S9 | | −2.265 | 1.160 | | | 1.530 |
| S10 | Fourth Lens | −1.968 | 0.380 | 1.535 | 56.100 | 2.203 |
| S11 | | 8.600 | 0.052 | | | 2.445 |
| S12 | Filter | Infinity | 0.110 | 1.518 | 64.166 | 2.558 |
| S13 | | Infinity | 0.879 | | | 2.576 |
| S14 | Imaging Plane | Infinity | 0.011 | | | 2.823 |

Aspherical characteristics of the optical imaging system 200 according to the second example are listed in Table 4.

TABLE 4

| Surface No. | S3 | S4 | S5 | S6 | S7 |
| --- | --- | --- | --- | --- | --- |
| K | −1.98583 | −4.50680 | 17.54674 | 5.83849 | 9.60597 |
| A | −0.00019 | −0.00808 | 0.00669 | −0.01627 | −0.12053 |
| B | 0.00000 | 0.00235 | −0.02391 | 0.09116 | 0.18739 |
| C | 0.00000 | 0.00009 | −0.00098 | −0.61202 | −0.51671 |
| D | 0.00000 | −0.00058 | −0.00311 | 1.60562 | 1.00110 |
| E | 0.00000 | 0.00026 | 0.00000 | −2.38292 | −1.13415 |
| F | 0.00000 | 0.00000 | 0.00000 | 2.11622 | 0.76623 |
| G | 0.00000 | −0.00003 | 0.00000 | −1.10589 | −0.29980 |
| H | 0.00000 | −0.00001 | 0.00000 | 0.31343 | 0.06218 |
| J | 0.00000 | 0.00001 | 0.00000 | −0.03703 | −0.00530 |

| Surface No. | S8 | S9 | S10 | S11 |
| --- | --- | --- | --- | --- |
| K | −99.00000 | −3.70427 | −1.30044 | −1.30044 |
| A | −0.22871 | −0.08327 | 0.00492 | 0.00492 |
| B | 0.20221 | −0.03409 | −0.05881 | −0.05881 |
| C | −0.25100 | 0.18191 | 0.09468 | 0.09468 |
| D | 0.38724 | −0.25257 | −0.06756 | −0.06756 |
| E | −0.34703 | 0.23885 | 0.02811 | 0.02811 |
| F | 0.16375 | −0.15162 | −0.00713 | −0.00713 |
| G | −0.03537 | 0.06033 | 0.00108 | 0.00108 |
| H | 0.00107 | −0.01351 | −0.00009 | −0.00009 |
| J | 0.00047 | 0.00129 | 0.00000 | 0.00000 |

Figure 5:
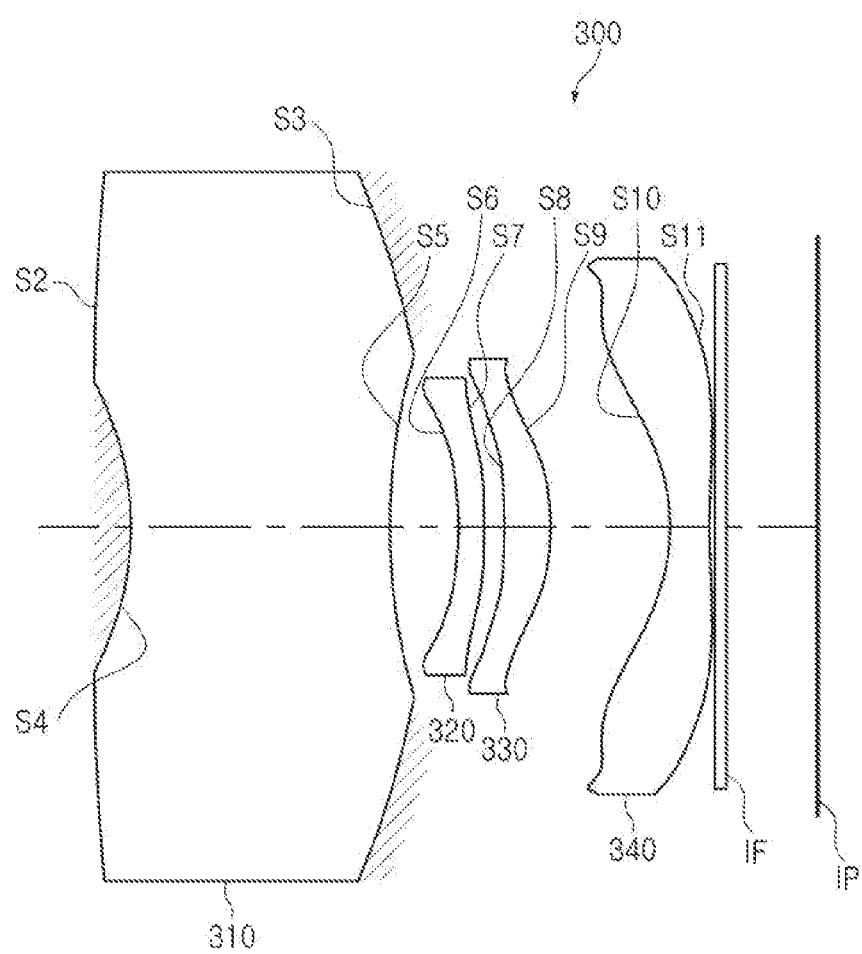
FIG. 5 is a diagram illustrating a third example of an optical imaging system.

Hereinafter, an optical imaging system 300 according to a third example will be described with reference to FIG. 5.

The optical imaging system 300 may include a plurality of lenses having refractive power. For example, the optical imaging system 300 may include a first lens 310, a second lens 320, a third lens 330, and a fourth lens 340. The first to fourth lenses 310 to 340 may be disposed in order from an object side at intervals.

The first lens 310 may have positive refractive power, and may have a convex object-side surface around, but not including, the paraxial region, and a concave image-side surface. The second lens 320 may have negative refractive power, and may have a concave object-side surface and a convex image-side surface. The third lens 330 may have positive refractive power, and may have a concave object-side surface and a convex image-side surface. The fourth lens 340 may have negative refractive power, and may have a concave object-side surface and a concave image-side surface. Inflection points may be formed on the object-side surface and the image-side surface of the fourth lens 340.

The first lens 310 may be configured to have an optical path having a significant length. For example, the optical path of the first lens 310 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 300 according to the third example may secure a significant optical path required for long-range image capturing through the first lens 310.

The optical imaging system 300 may include a filter IF. For example, the filter IF may be disposed between the fourth lens 340 and the imaging plane IP. The filter IF may be configured to block infrared light.

Figure 6:
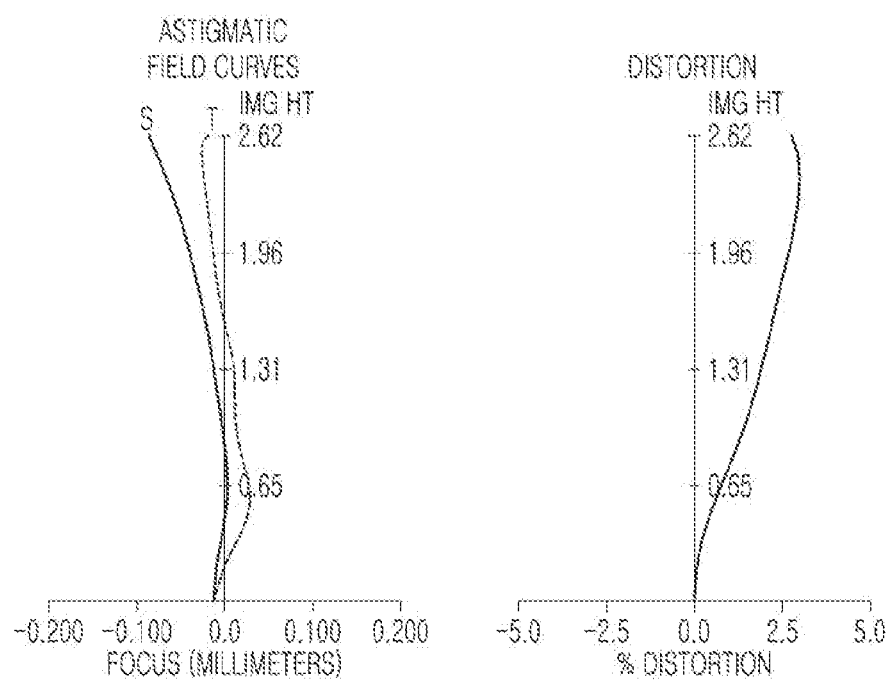
FIG. 6 is a view illustrating aberration curves of the optical imaging system illustrated in FIG. 5.

The optical imaging system according to the third example exhibits aberration characteristics as illustrated in FIG. 6. Lens characteristics of the optical imaging system according to the third example are listed in Table 5.

TABLE 5

| Surface No. | Note | Radius of Curvature | Thickness/ Distance | Refractive Index | Abbe Number | Effective Radius |
| --- | --- | --- | --- | --- | --- | --- |
| S1 | Stop | Infinity | 0.000 | | | |
| S2 | First Lens | 781.855 | 3.253 | 1.614 | 25.900 | 3.280 |
| S3 | | −8.143 | −2.907 | | | 3.435 |
| S4 | | −2.805 | 2.521 | | | 1.261 |
| S5 | | 5.584 | 0.653 | | | 1.229 |
| S6 | Second Lens | −3.906 | 0.252 | 1.640 | 23.500 | 1.250 |

TABLE 5-continued

| Surface No. | Note | Radius of Curvature | Thickness/ Distance | Refractive Index | Abbe Number | Effective Radius |
|---|---|---|---|---|---|---|
| S7 | | −9.202 | 0.195 | | | 1.358 |
| S8 | Third Lens | −12.984 | 0.445 | 1.535 | 56.100 | 1.409 |
| S9 | | −2.270 | 1.156 | | | 1.532 |
| S10 | Fourth Lens | −1.966 | 0.380 | 1.535 | 56.100 | 2.192 |
| S11 | | 7.984 | 0.052 | | | 2.439 |
| S12 | Filter | Infinity | 0.110 | 1.518 | 64.166 | 2.548 |
| S13 | | Infinity | 0.879 | | | 2.566 |
| S14 | Imaging Plane | Infinity | 0.011 | | | 2.823 |

Aspherical characteristics of the optical imaging system according to the third example are listed in Table 6.

TABLE 6

| Surface No. | S3 | S4 | S5 | S6 | S7 |
|---|---|---|---|---|---|
| K | −1.98583 | −4.50680 | 17.54674 | 5.83849 | 9.60597 |
| A | −0.00019 | −0.00808 | 0.00669 | −0.01627 | −0.12053 |
| B | 0.00000 | 0.00235 | −0.02391 | 0.09116 | 0.18739 |
| C | 0.00000 | 0.00009 | −0.00098 | −0.61202 | −0.51671 |
| D | 0.00000 | −0.00058 | −0.00311 | 1.60562 | 1.00110 |
| E | 0.00000 | 0.00026 | 0.00000 | −2.38292 | −1.13415 |
| F | 0.00000 | 0.00000 | 0.00000 | 2.11622 | 0.76623 |
| G | 0.00000 | −0.00003 | 0.00000 | −1.10589 | −0.29980 |
| H | 0.00000 | −0.00001 | 0.00000 | 0.31343 | 0.06218 |
| J | 0.00000 | 0.00001 | 0.00000 | −0.03703 | −0.00530 |

| Surface No. | S8 | S9 | S10 | S11 |
|---|---|---|---|---|
| K | −99.00000 | −3.70427 | −1.30044 | −19.44223 |
| A | −0.22871 | −0.08327 | 0.00492 | −0.03661 |
| B | 0.20221 | −0.03409 | −0.05881 | −0.00150 |
| C | −0.25100 | 0.18191 | 0.09468 | 0.00555 |
| D | 0.38724 | −0.25257 | −0.06756 | −0.00161 |
| E | −0.34703 | 0.23885 | 0.02811 | −0.00013 |
| F | 0.16375 | −0.15162 | −0.00713 | 0.00017 |
| G | −0.03537 | 0.06033 | 0.00108 | −0.00004 |
| H | 0.00107 | −0.01351 | −0.00009 | 0.00000 |
| J | 0.00047 | 0.00129 | 0.00000 | 0.00000 |

Figure 7:
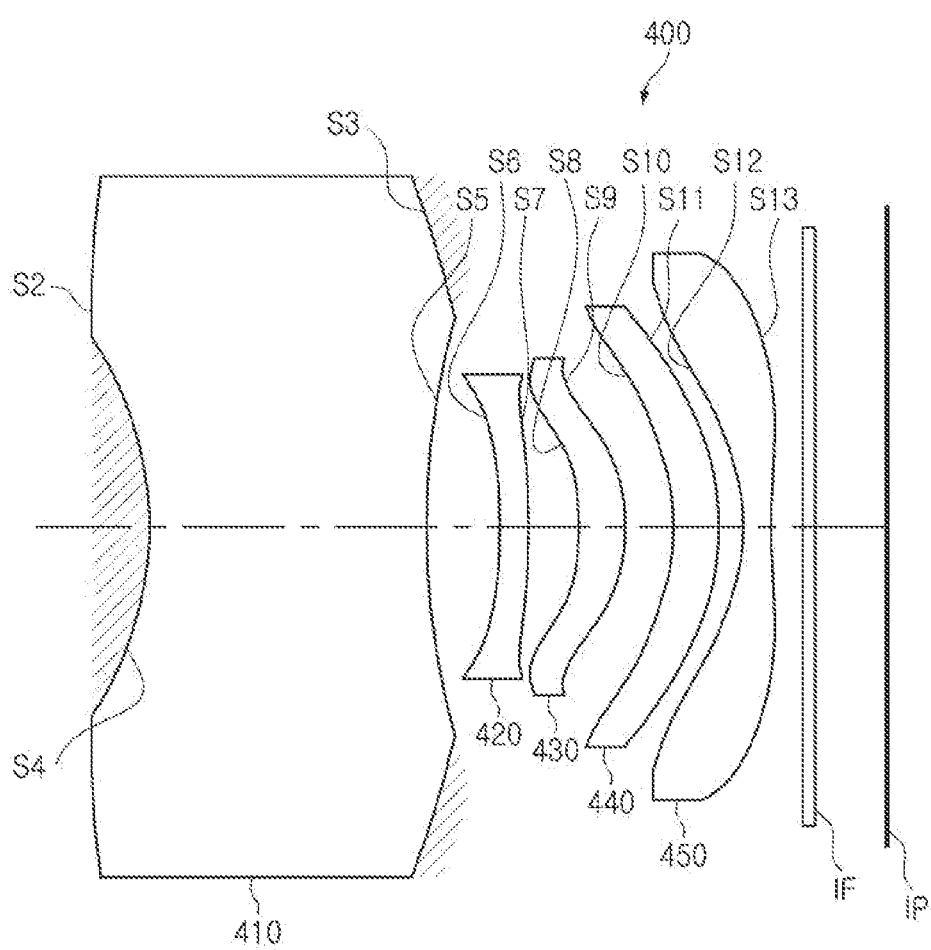
FIG. 7 is a diagram illustrating a fourth example of an optical imaging system.

Hereinafter, an optical imaging system 400 according to a fourth example will be described with reference to FIG. 7.

The optical imaging system 400 may include a plurality of lenses, each having refractive power. For example, the optical imaging system 400 may include a first lens 410, a second lens 420, a third lens 430, a fourth lens 440, and a fifth lens 450. The first to fifth lenses 410 to 450 may be disposed in order from an object side at intervals.

The first lens 410 may have positive refractive power, and may have a concave object-side surface around, but not including, the paraxial region, and a concave image-side surface. The second lens 420 may have negative refractive power, and may have a concave object-side surface and a convex image-side surface. The third lens 430 may have positive refractive power, and may have a concave object-side surface and a convex image-side surface. The fourth lens 440 may have negative refractive power, and may have a concave object-side surface and a convex image-side surface. The fifth lens 450 may have negative refractive power, and may have a concave object-side surface and a concave image-side surface. Inflection points may be formed on the object-side surface and the image-side surface of the fifth lens 450.

The first lens 410 may be configured to have an optical path having a significant length. For example, the optical path of the first lens 410 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 400 according to the fourth example may secure a significant optical path required for long-range image capturing through the first lens 410.

The optical imaging system 400 may include a filter IF. For example, the filter IF may be disposed between the fifth lens 450 and the imaging plane IP. The filter IF may be configured to block infrared light.

Figure 8:
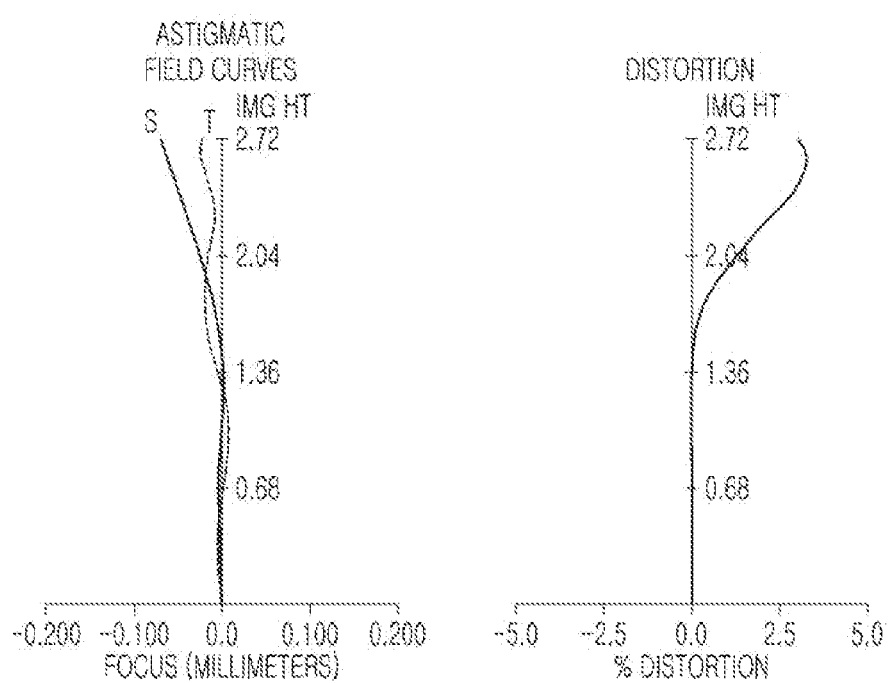
FIG. 8 is a view illustrating aberration curves of the optical imaging system illustrated in FIG. 7.

The optical imaging system 400 according to the fourth example exhibits aberration characteristics as illustrated in FIG. 8. Lens characteristics of the optical imaging system 400 according to the fourth example are listed in table 7.

TABLE 7

| Surface No. | Note | Radius of Curvature | Thickness/ Distance | Refractive Index | Abbe Number | Effective Radius |
|---|---|---|---|---|---|---|
| S1 | Stop | Infinity | 0.000 | | | |
| S2 | First Lens | −2601.669 | 3.400 | 1.743 | 49.200 | 2.932 |
| S3 | | −8.110 | −2.902 | | | 3.118 |
| S4 | | −2.810 | 2.444 | | | 1.166 |
| S5 | | 9.379 | 0.650 | | | 1.180 |
| S6 | Second Lens | −4.404 | 0.250 | 1.640 | 23.500 | 1.206 |
| S7 | | −9.176 | 0.445 | | | 1.319 |
| S8 | Third Lens | −2.958 | 0.408 | 1.544 | 56.100 | 1.390 |
| S9 | | −1.750 | 0.423 | | | 1.485 |
| S10 | Fourth Lens | −2.165 | 0.400 | 1.535 | 56.100 | 1.764 |
| S11 | | −2.325 | 0.218 | | | 1.962 |
| S12 | Fifth Lens | −2.016 | 0.250 | 1.535 | 56.100 | 2.160 |
| S13 | | 6.105 | 0.275 | | | 2.434 |
| S14 | Filter | Infinity | 0.110 | 1.518 | 64.166 | 2.647 |

TABLE 7-continued

| Surface No. | Note | Radius of Curvature | Thickness/ Distance | Refractive Index | Abbe Number | Effective Radius |
|---|---|---|---|---|---|---|
| S15 | | Infinity | 0.630 | | | 2.664 |
| S16 | Imaging Plane | Infinity | 0.000 | | | 2.821 |

Aspherical characteristics of the optical imaging system according to the fourth example are listed in Table 8.

TABLE 8

| Surface No. | S3 | S4 | S5 | S6 | S7 | S8 |
|---|---|---|---|---|---|---|
| K | −1.99318 | −4.63551 | 34.23633 | −1.27184 | 41.94220 | −24.38554 |
| A | −0.00019 | −0.00689 | 0.02242 | −0.00322 | −0.05169 | −0.38445 |
| B | 0.00000 | 0.00255 | −0.03054 | −0.02963 | 0.03141 | 0.16832 |
| C | 0.00000 | −0.00004 | 0.01203 | 0.00631 | 0.01127 | 0.03190 |
| D | 0.00000 | −0.00051 | −0.00307 | −0.00035 | −0.00172 | −0.01685 |
| E | 0.00000 | 0.00020 | 0.00000 | 0.00001 | 0.00000 | 0.00000 |
| F | 0.00000 | 0.00000 | 0.00000 | 0.00000 | 0.00000 | 0.00000 |
| G | 0.00000 | 0.00000 | 0.00000 | 0.00000 | 0.00000 | 0.00000 |
| H | 0.00000 | 0.00000 | 0.00000 | 0.00000 | 0.00000 | 0.00000 |
| J | 0.00000 | 0.00000 | 0.00000 | 0.00000 | 0.00000 | 0.00000 |

| Surface No. | S9 | S10 | S11 | S12 | S13 |
|---|---|---|---|---|---|
| K | 0.10330 | −0.04272 | −0.13306 | −0.69638 | −40.33632 |
| A | −0.11614 | 0.01616 | 0.00415 | −0.01067 | −0.04886 |
| B | 0.06326 | −0.00085 | 0.00217 | 0.01185 | 0.00461 |
| C | 0.01554 | 0.00030 | 0.00018 | 0.00000 | 0.00151 |
| D | −0.00298 | 0.00021 | −0.00004 | −0.00028 | −0.00036 |
| E | −0.00002 | 0.00000 | 0.00000 | 0.00000 | 0.00001 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.0 |

Figure 9:
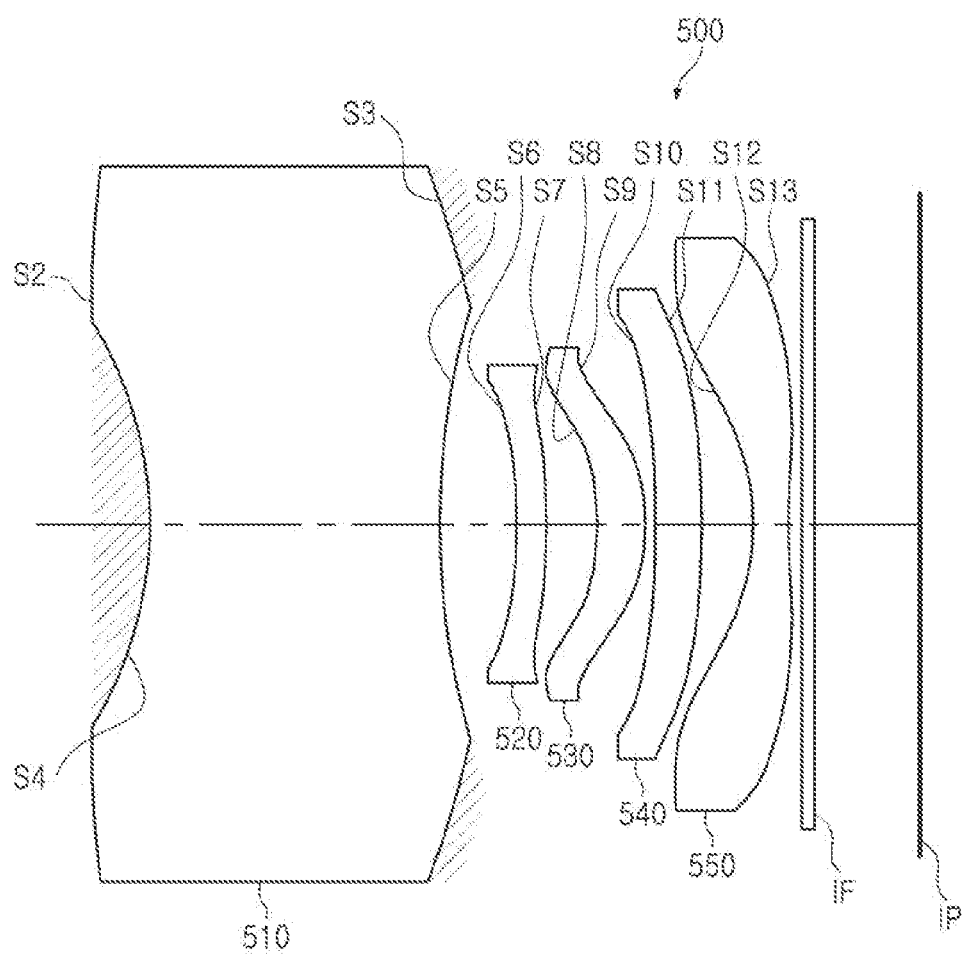
FIG. 9 is a diagram illustrating a fifth example of an optical imaging system.

Hereinafter, an optical imaging system 500 according to a fifth example will be described with reference to FIG. 9.

The optical imaging system 500 may include a plurality of lenses, each having refractive power. For example, the optical imaging system 500 may include a first lens 510, a second lens 520, a third lens 530, a fourth lens 540, and a fifth lens 550. The first to fifth lenses 510 to 550 may be disposed in order from an object side at intervals.

The first lens 510 may have positive refractive power, and may have a concave object-side surface around, but not including, the paraxial region, and a concave image-side surface. The second lens 520 may have negative refractive power, and may have a concave object-side surface and a convex image-side surface. The third lens 530 may have a positive refractive power, and may have a concave object-side surface and a convex image-side surface. The fourth lens 540 may have positive refractive power, and may have a concave object-side surface and a convex image-side surface. The fifth lens 550 may have negative refractive power, and may have a concave object-side surface and a concave image-side surface. Inflection points may be formed on the object-side surface and the image-side surface of the fifth lens 550.

The first lens 510 may be configured to have an optical path having a significant length. For example, the optical path of the first lens 510 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 500 according to the fifth example may secure a significant optical path required for long-range image capturing through the first lens 510.

The optical imaging system 500 may include a filter IF. For example, the filter IF may be disposed between the fifth lens 550 and the imaging plane IP. The filter IF may be configured to block infrared light.

Figure 10:
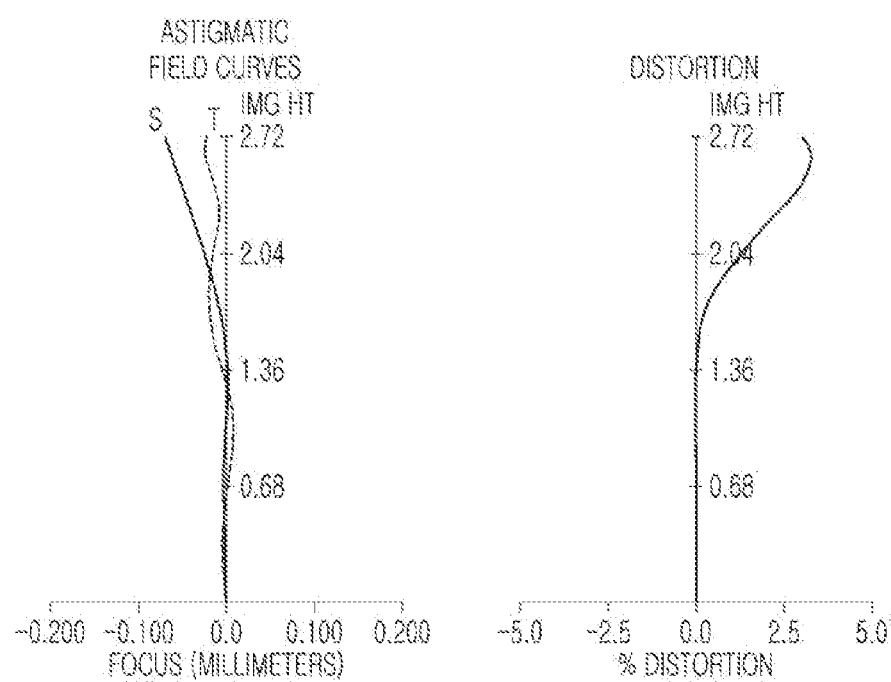
FIG. 10 is a view illustrating aberration curves of the optical imaging system illustrated in FIG. 9.

The optical imaging system 500 according to the fifth example exhibits aberration characteristics as illustrated in FIG. 10. Lens characteristics of the optical imaging system 500 according to the fifth example are listed in Table 9.

TABLE 9

| Surface No. | Note | Radius of Curvature | Thickness/ Distance | Refractive Index | Abbe Number | Effective Radius |
|---|---|---|---|---|---|---|
| S1 | Stop | Infinity | 0.000 | | | |
| S2 | First Lens | −14288.941 | 3.400 | 1.743 | 49.200 | 2.863 |
| S3 | | −8.124 | −2.902 | | | 3.055 |
| S4 | | −2.819 | 2.444 | | | 1.153 |

TABLE 9-continued

| Surface No. | Note | Radius of Curvature | Thickness/ Distance | Refractive Index | Abbe Number | Effective Radius |
|---|---|---|---|---|---|---|
| S5 | | 8.997 | 0.650 | | | 1.185 |
| S6 | Second Lens | -4.501 | 0.250 | 1.640 | 23.500 | 1.227 |
| S7 | | -8.838 | 0.427 | | | 1.352 |
| S8 | Third Lens | -3.146 | 0.408 | 1.535 | 56.100 | 1.437 |
| S9 | | -1.810 | 0.085 | | | 1.532 |
| S10 | Fourth Lens | -9.368 | 0.400 | 1.535 | 56.100 | 1.781 |
| S11 | | -8.227 | 0.430 | | | 2.000 |
| S12 | Fifth Lens | -1.971 | 0.300 | 1.535 | 56.100 | 2.177 |
| S13 | | 6.252 | 0.109 | | | 2.436 |
| S14 | Filter | Infinity | 0.110 | 1.518 | 64.166 | 2.576 |
| S15 | | Infinity | 0.901 | | | 2.594 |
| S16 | Imaging Plane | Infinity | -0.011 | | | 2.821 |

Aspherical characteristics of the optical imaging system according to the fifth example are listed in Table 10.

TABLE 10

| Surface No. | S3 | S4 | S5 | S6 | S7 | S8 |
|---|---|---|---|---|---|---|
| K | -1.99928 | -4.70783 | 33.76195 | 0.28173 | 37.24904 | -25.23744 |
| A | -0.00018 | -0.00681 | 0.02492 | -0.00636 | -0.06021 | -0.37452 |
| B | 0.00000 | 0.00250 | -0.02923 | -0.02380 | 0.03290 | 0.16136 |
| C | 0.00000 | 0.00010 | 0.01350 | 0.00851 | 0.01171 | 0.03010 |
| D | 0.00000 | -0.00056 | -0.00376 | -0.00210 | -0.00218 | -0.01579 |
| E | 0.00000 | 0.00020 | 0.00000 | 0.00001 | 0.00000 | 0.00000 |
| F | 0.00000 | 0.00000 | 0.00000 | 0.00000 | 0.00000 | 0.00000 |
| G | 0.00000 | 0.00000 | 0.00000 | 0.00000 | 0.00000 | 0.00000 |
| H | 0.00000 | 0.00000 | 0.00000 | 0.00000 | 0.00000 | 0.00000 |
| J | 0.00000 | 0.00000 | 0.00000 | 0.00000 | 0.00000 | 0.00000 |

| Surface No. | S9 | S10 | S11 | S12 | S13 |
|---|---|---|---|---|---|
| K | 0.15067 | 20.89729 | 7.64563 | -0.76971 | -76.28343 |
| A | -0.11981 | -0.00038 | -0.00791 | -0.01104 | -0.04504 |
| B | 0.06413 | -0.00284 | -0.00083 | 0.01254 | 0.00553 |
| C | 0.01516 | 0.00066 | -0.00007 | 0.00018 | 0.00134 |
| D | -0.00387 | -0.00016 | 0.00001 | -0.00026 | -0.00037 |
| E | -0.00002 | 0.00000 | 0.00002 | 0.00001 | 0.00001 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 11:
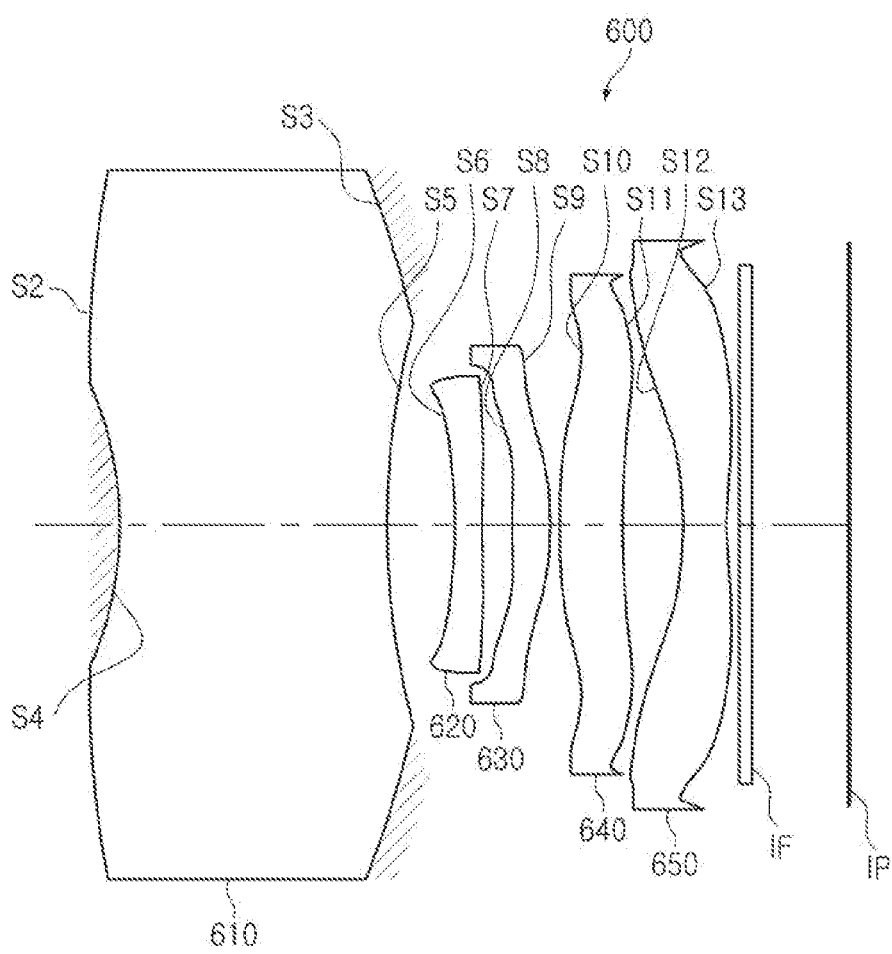
FIG. 11 is a diagram illustrating a sixth example of an optical imaging system.

Hereinafter, an optical imaging system 600 according to a sixth example will be described with reference to FIG. 11.

The optical imaging system 600 may include a plurality of lenses having refractive power. For example, the optical imaging system 600 may include a first lens 610, a second lens 620, a third lens 630, a fourth lens 640, and a fifth lens 550. The first to fifth lenses 610 to 650 may be disposed in order from an object side at intervals.

The first lens 610 may have positive refractive power and may have a convex object-side surface around, but not including, the paraxial region, and a concave image-side surface. The second lens 620 may have negative refractive power, and may have a concave object-side surface and a concave image-side surface. The third lens 630 may have positive refractive power and may have a convex object-side surface and a convex image-side surface. The fourth lens 640 may have positive refractive power, and may have a convex object-side surface and a concave image-side surface. The fifth lens 650 may have negative refractive power, and may have a concave object-side surface and a concave image-side surface. Inflection points may be formed on the fourth and fifth lenses 640 and 650.

The first lens 610 may be configured to have an optical path having a significant length. For example, the optical path of the first lens 610 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 600 according to the sixth example may secure a significant optical path required for long-range image capturing through the first lens 610.

The optical imaging system 600 may include a filter IF. For example, the filter IF may be disposed between the fifth lens 650 and the imaging plane IP. The filter IF may be configured to block infrared light.

Figure 12:
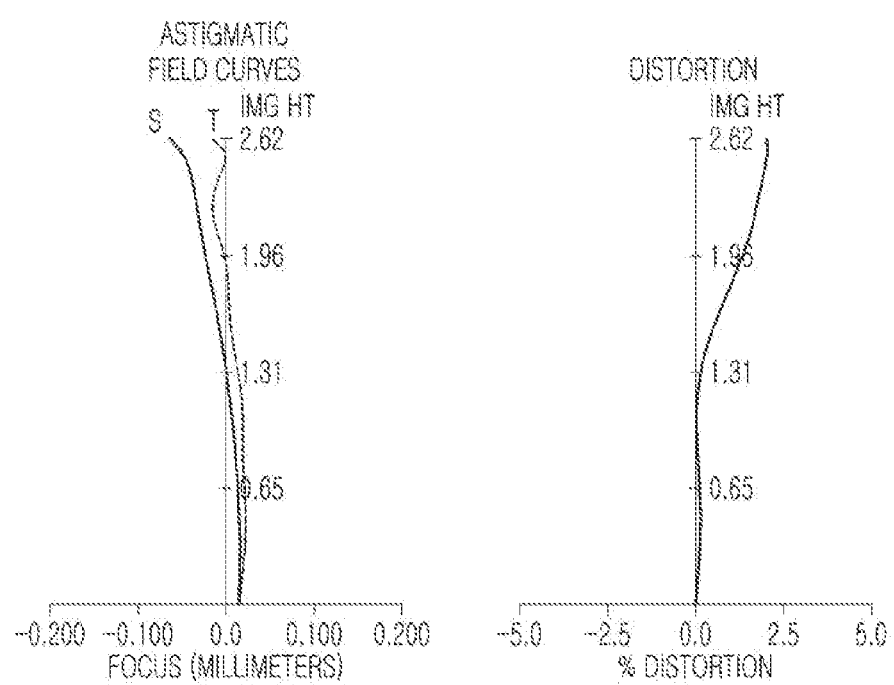
FIG. 12 is a view illustrating aberration curves of the optical imaging system illustrated in FIG. 11.

The optical imaging system 600 according to the sixth example exhibits aberration characteristics as illustrated in FIG. 12. Lens characteristics of the optical imaging system 500 according to the fifth example are listed in table 11.

TABLE 11

| Surface No. | Note | Radius of Curvature | Thickness/ Distance | Refractive Index | Abbe Number | Effective Radius |
|---|---|---|---|---|---|---|
| S1 | Stop | Infinity | 0.000 | | | |
| S2 | First Lens | 818.573 | 3.180 | 1.661 | 20.400 | 3.136 |
| S3 | | −8.220 | −2.902 | | | 3.295 |
| S4 | | −2.937 | 2.444 | | | 1.246 |
| S5 | | 7.979 | 0.650 | | | 1.218 |
| S6 | Second Lens | −3.912 | 0.250 | 1.680 | 18.400 | 1.233 |
| S7 | | 11.754 | 0.278 | | | 1.340 |
| S8 | Third Lens | 9.605 | 0.350 | 1.614 | 25.900 | 1.392 |
| S9 | | −3.496 | 0.085 | | | 1.555 |
| S10 | Fourth Lens | 7.599 | 0.580 | 1.535 | 56.100 | 1.971 |
| S11 | | 11.736 | 0.559 | | | 2.188 |
| S12 | Fifth Lens | −3.459 | 0.400 | 1.535 | 56.100 | 2.288 |
| S13 | | 4.058 | 0.127 | | | 2.473 |
| S14 | Filter | Infinity | 0.110 | 1.518 | 64.166 | 2.599 |
| S15 | | Infinity | 0.905 | | | 2.616 |
| S16 | Imaging Plane | Infinity | −0.015 | | | 2.826 |

Aspherical characteristics of the optical imaging system according to the sixth example are listed in Table 12.

TABLE 12

| Surface No. | S3 | S4 | S5 | S6 | S7 | S8 |
|---|---|---|---|---|---|---|
| K | −1.99875 | −4.80242 | 35.87110 | −40.39823 | −90.00000 | −59.63001 |
| A | −0.00018 | −0.00691 | 0.03256 | 0.02425 | −0.10397 | −0.37034 |
| B | 0.00000 | 0.00205 | −0.03081 | −0.03429 | 0.44502 | 0.52491 |
| C | 0.00000 | 0.00005 | 0.00576 | 0.15388 | −1.17687 | −0.47873 |
| D | 0.00000 | −0.00052 | −0.00411 | −0.89775 | 1.61980 | 0.12682 |
| E | 0.00000 | 0.00021 | 0.00000 | 2.10329 | −1.32130 | 0.04161 |
| F | 0.00000 | 0.00001 | 0.00000 | −2.60236 | 0.65241 | 0.10478 |
| G | 0.00000 | 0.00000 | 0.00000 | 1.80899 | −0.17121 | −0.15853 |
| H | 0.00000 | 0.00000 | 0.00000 | −0.67167 | 0.01291 | 0.07051 |
| J | 0.00000 | 0.00000 | 0.00000 | 0.10393 | 0.00197 | −0.01076 |

| Surface No. | S9 | S10 | S11 | S12 | S13 |
|---|---|---|---|---|---|
| K | 1.48957 | 9.33549 | 25.40869 | 0.33221 | −45.29881 |
| A | −0.16402 | 0.02588 | 0.07621 | −0.03800 | −1.50400 |
| B | 0.17148 | −0.03984 | −0.14136 | 0.04862 | 1.81138 |
| C | 0.13845 | 0.10035 | 0.12655 | −0.03694 | 3.42711 |
| D | −0.41214 | −0.12547 | −0.07244 | 0.02672 | −14.89607 |
| E | 0.40173 | 0.08408 | 0.02845 | −0.01386 | 19.82343 |
| F | −0.21183 | −0.03333 | −0.00790 | 0.00448 | −12.74281 |
| G | 0.06343 | 0.00778 | 0.00147 | −0.00085 | 5.48973 |
| H | −0.01009 | −0.00098 | −0.00016 | 0.00008 | −2.87119 |
| J | 0.00066 | 0.00005 | 0.00001 | 0.00000 | 0.96459 |

Figure 13:
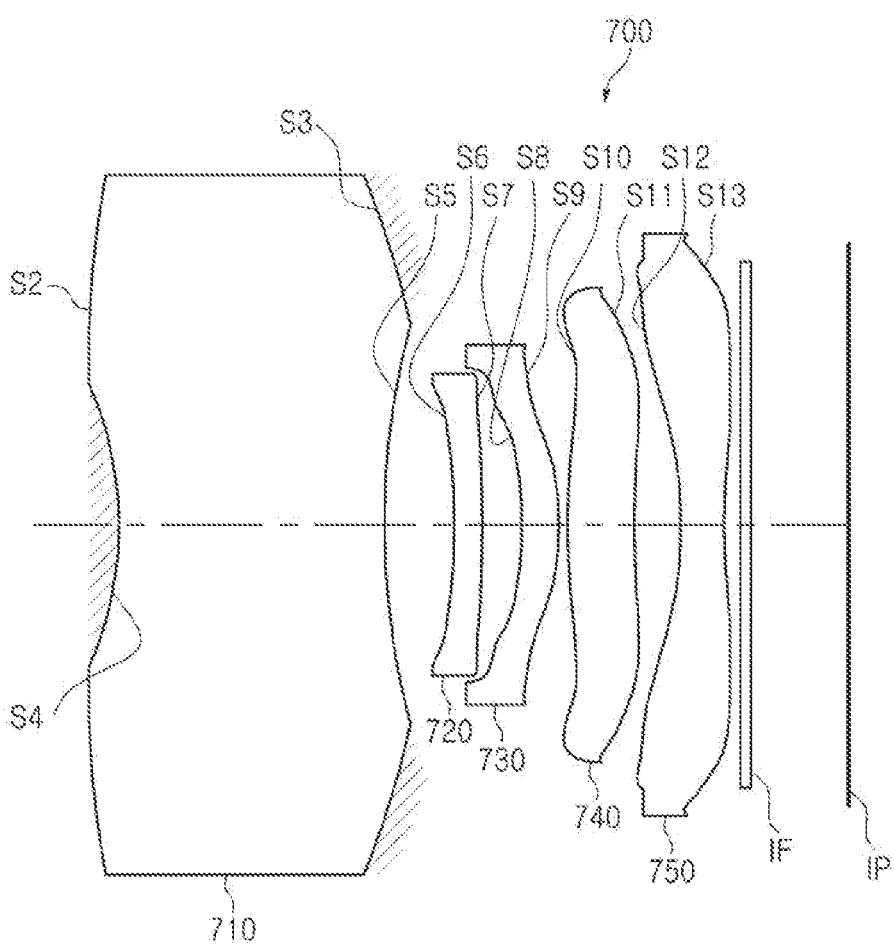
FIG. 13 is a diagram illustrating a seventh example of an optical imaging system.

Hereinafter, an optical imaging system 700 according to a seventh example will be described with reference to FIG. 13.

The optical imaging system 700 may include a plurality of lenses having refractive power. For example, the optical imaging system 700 may include a first lens 710, a second lens 720, a third lens 730, a fourth lens 740, and a fifth lens 750. The first to fifth lenses 710 to 750 may be disposed in order from an object side at intervals.

The first lens 710 may have positive refractive power, and may have a convex object-side surface around, but not including, the paraxial region, and a concave image-side surface. The second lens 720 may have negative refractive power, and may have a concave object-side surface and a convex image-side surface. The third lens 730 may have positive refractive power and may have a concave object-side surface and a convex image-side surface. The fourth lens 740 may have positive refractive power and may have a convex object-side surface and a concave image-side surface. The fifth lens 750 may have negative refractive power, and may have a concave object-side surface and a concave image-side surface. Inflection points may be formed on the fourth and fifth lenses 740 and 750.

The first lens 710 may be configured to have an optical path having a significant length. For example, the optical path of the first lens 710 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 700 according to the seventh example may secure a significant optical path required for long-range image capturing through the first lens 710.

The optical imaging system 700 may include a filter IF. For example, the filter IF may be disposed between the fifth lens 750 and the imaging plane IP. The filter IF may be configured to block infrared light.

Figure 14:
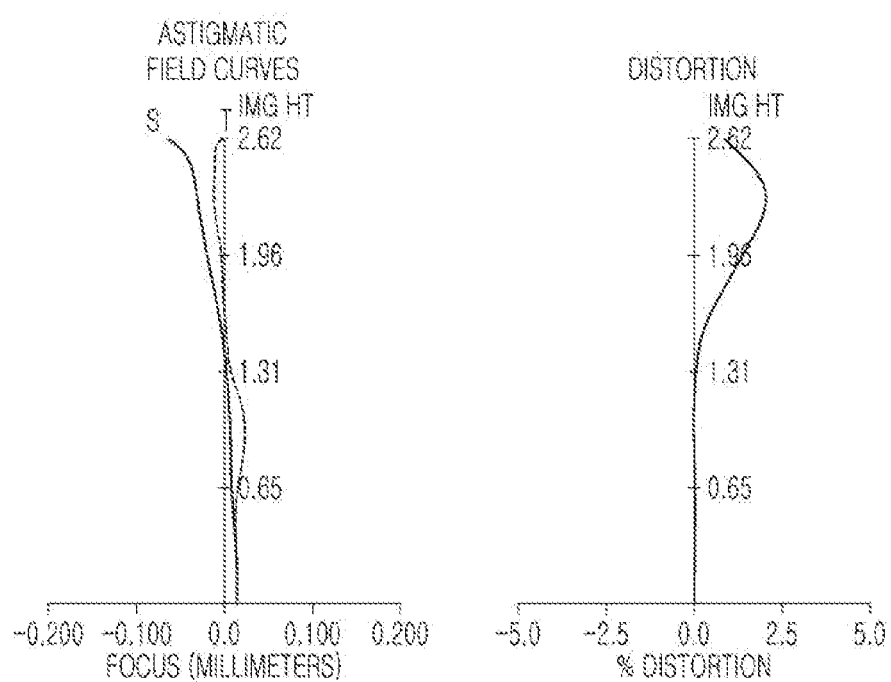
FIG. 14 is a view illustrating aberration curves of the optical imaging system illustrated in FIG. 13.

The optical imaging system 700 according to the seventh example exhibits aberration characteristics as illustrated in FIG. 14. Lens characteristics of the optical imaging system 700 according to the seventh example are listed in Table 13.

TABLE 13

| Surface No. | Note | Radius of Curvature | Thickness/ Distance | Refractive Index | Abbe Number | Effective Radius |
|---|---|---|---|---|---|---|
| S1 | Stop | Infinity | 0.000 | | | |
| S2 | First Lens | 827.377 | 3.180 | 1.743 | 49.200 | 3.100 |
| S3 | | −8.220 | −2.902 | | | 3.246 |
| S4 | | −2.917 | 2.444 | | | 1.210 |
| S5 | | 8.255 | 0.650 | | | 1.199 |
| S6 | Second Lens | −4.169 | 0.250 | 1.614 | 25.900 | 1.223 |
| S7 | | −160.098 | 0.362 | | | 1.310 |
| S8 | Third Lens | −23.446 | 0.350 | 1.567 | 38.000 | 1.365 |
| S9 | | −2.905 | 0.085 | | | 1.559 |
| S10 | Fourth Lens | 9.436 | 0.610 | 1.535 | 56.100 | 1.934 |
| S11 | | 11.805 | 0.429 | | | 2.133 |
| S12 | Fifth Lens | −3.851 | 0.400 | 1.535 | 56.100 | 2.327 |
| S13 | | 3.745 | 0.142 | | | 2.532 |
| S14 | Filter | Infinity | 0.110 | 1.518 | 64.166 | 2.622 |
| S15 | | Infinity | 0.905 | | | 2.636 |
| S16 | Imaging Plane | Infinity | −0.015 | | | 2.824 |

Aspherical characteristics of the optical imaging system according to the seventh example are listed in Table 14.

TABLE 14

| Surface No. | S3 | S4 | S5 | S6 | S7 | S8 |
|---|---|---|---|---|---|---|
| K | −2.00306 | −4.75395 | 35.98520 | −37.86621 | 99.00000 | −99.00000 |
| A | −0.00018 | −0.00701 | 0.02570 | −0.00934 | −0.16104 | −0.44232 |
| B | 0.00000 | 0.00207 | −0.02810 | 0.16784 | 0.79293 | 0.84790 |
| C | 0.00000 | 0.00007 | 0.00795 | −0.42657 | −2.20181 | −1.22404 |
| D | 0.00000 | −0.00054 | −0.00404 | 0.19237 | 3.55937 | 1.03922 |
| E | 0.00000 | 0.00021 | 0.00000 | 0.61969 | −3.80196 | −0.59170 |
| F | 0.00000 | 0.00001 | 0.00000 | −1.17921 | 2.74276 | 0.38655 |
| G | 0.00000 | 0.00000 | 0.00000 | 0.94713 | −1.25114 | −0.25884 |
| H | 0.00000 | 0.00000 | 0.00000 | −0.38321 | 0.31843 | 0.10067 |
| J | 0.00000 | 0.00000 | 0.00000 | 0.06332 | −0.03411 | −0.01552 |

| Surface No. | S9 | S10 | S11 | S12 | S13 |
|---|---|---|---|---|---|
| K | 1.01541 | 2.24456 | 26.68866 | 0.30754 | −36.89762 |
| A | −0.15489 | 0.06794 | 0.04654 | −0.03208 | −0.04202 |
| B | 0.18993 | −0.22508 | −0.10255 | 0.04243 | −0.00519 |
| C | −0.01816 | 0.35062 | 0.08790 | −0.02398 | 0.01755 |
| D | −0.20018 | −0.31351 | −0.05548 | 0.01229 | −0.00916 |
| E | 0.33152 | 0.16864 | 0.02498 | −0.00506 | 0.00275 |
| F | −0.26164 | −0.05631 | −0.00796 | 0.00136 | −0.00057 |
| G | 0.11065 | 0.01144 | 0.00171 | −0.00021 | 0.00008 |
| H | −0.02409 | −0.00129 | −0.00022 | 0.00002 | −0.00001 |
| J | 0.00213 | 0.00006 | 0.00001 | 0.00000 | 0.0 |

Figure 15:
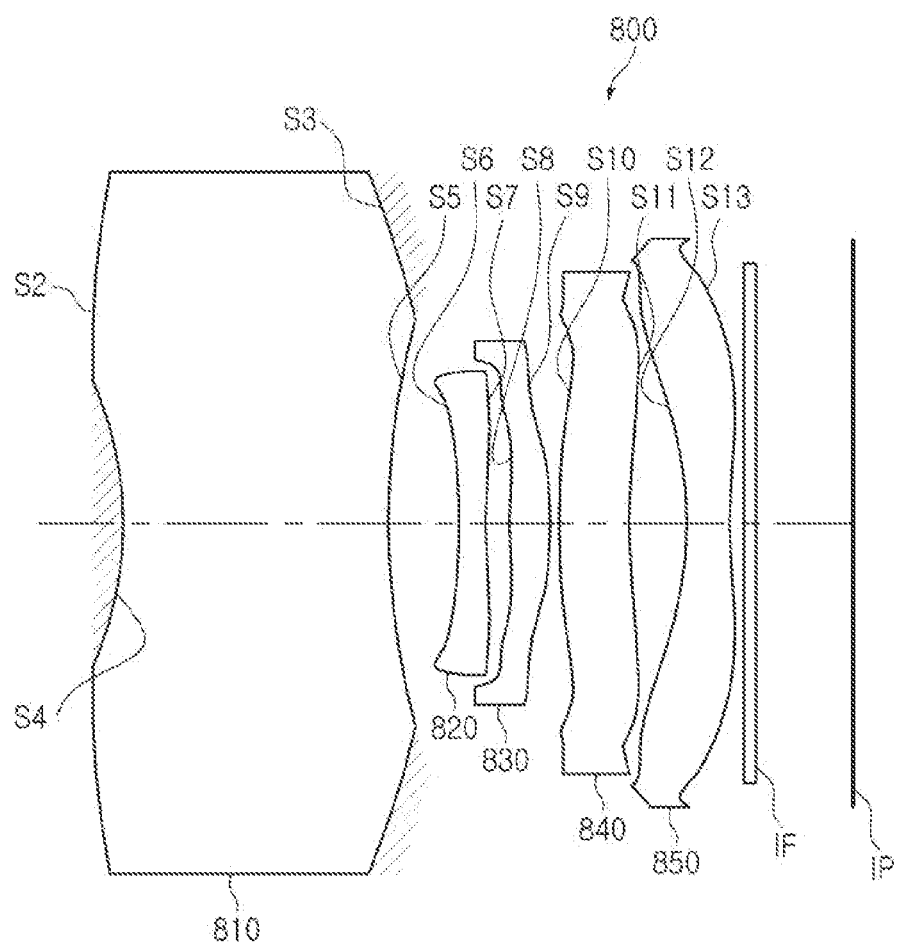
FIG. 15 is a diagram illustrating an eighth example of an optical imaging system.

Hereinafter, an optical imaging system according to an eighth example will be described with reference to FIG. 15.

The optical imaging system 800 may include a plurality of lenses, each having refractive power. For example, the optical imaging system 800 may include a first lens 810, a second lens 820, a third lens 830, a fourth lens 840, and a fifth lens 850. The first to fifth lenses 810 to 850 may be disposed in order from an object side at intervals.

The first lens 810 may have positive refractive power, and may have a convex object-side surface around, but not including, the paraxial region, and a concave image-side surface. The second lens 820 may have negative refractive power and may have a concave object-side surface and a concave image-side surface. The third lens 830 may have positive refractive power and may have a convex object-side surface and a convex image-side surface. The fourth lens 840 may have positive refractive power, and may have a convex object-side surface and a concave image-side surface. The fifth lens 850 may have negative refractive power, and may have a concave object-side surface and a concave image-side surface. Inflection points may be formed on the fourth and fifth lenses 840 and 850.

The first lens 810 may be configured to have an optical path having a significant length. For example, the optical path of the first lens 810 may include a first optical path connecting a first reflective surface S3 from an object-side surface S2, a second optical path connecting a second reflective surface S4 from the first reflective surface S3, and a third optical path connecting an image-side surface S5 from the second reflective surface S4. Thus, the optical imaging system 800 according to the eighth example may secure a significant optical path required for long-range image capturing through the first lens 810.

The optical imaging system 800 may include a filter IF. For example, the filter IF may be disposed between the fifth lens 850 and the imaging plane IP. The filter IF may be configured to block infrared light.

Figure 16:
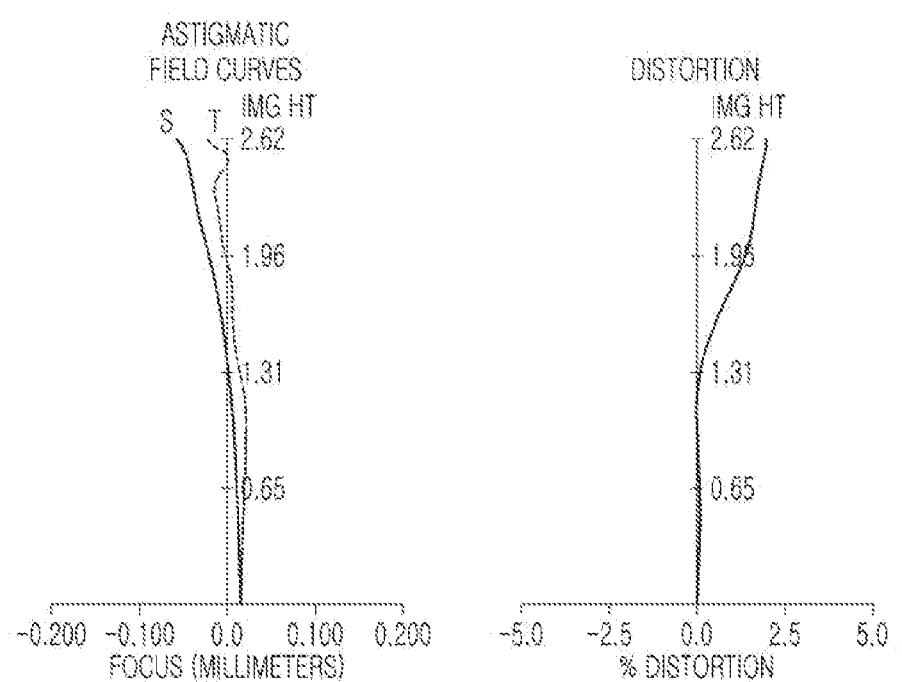
FIG. 16 is a view illustrating aberration curves of the optical imaging system illustrated in FIG. 15.

The optical imaging system 800 according to the eighth example exhibits aberration characteristics as illustrated in FIG. 16. Lens characteristics of the optical imaging system 800 according to the eighth example are listed in Table 15.

TABLE 15

| Surface No. | Note | Radius of Curvature | Thickness/ Distance | Refractive Index | Abbe Number | Effective Radius |
|---|---|---|---|---|---|---|
| S1 | Stop | Infinity | 0.000 | | | |
| S2 | First Lens | 766.550 | 3.180 | 1.661 | 20.400 | 3.100 |
| S3 | | −8.233 | −2.902 | | | 3.246 |
| S4 | | −2.953 | 2.444 | | | 1.210 |
| S5 | | 7.818 | 0.650 | | | 1.199 |
| S6 | Second Lens | −4.824 | 0.250 | 1.680 | 18.400 | 1.223 |
| S7 | | 4.769 | 0.221 | | | 1.310 |
| S8 | Third Lens | 4.179 | 0.373 | 1.614 | 25.900 | 1.365 |
| S9 | | −4.064 | 0.085 | | | 1.559 |
| S10 | Fourth Lens | 8.820 | 0.647 | 1.535 | 56.100 | 1.934 |
| S11 | | 11.669 | 0.524 | | | 2.133 |
| S12 | Fifth Lens | −3.694 | 0.400 | 1.535 | 56.100 | 2.327 |
| S13 | | 4.018 | 0.127 | | | 2.532 |
| S14 | Filter | Infinity | 0.110 | 1.518 | 64.166 | 2.622 |
| S15 | | Infinity | 0.905 | | | 2.636 |
| S16 | Imaging Plane | Infinity | −0.015 | | | 2.824 |

Aspherical characteristics of the optical imaging system according to the eighth example are listed in Table 16.

TABLE 16

| Surface No. | S3 | S4 | S5 | S6 | S7 | S8 |
|---|---|---|---|---|---|---|
| K | −1.99933 | −4.81160 | 33.59603 | −47.56711 | −64.28190 | −19.82052 |
| A | −0.00018 | −0.00690 | 0.03294 | 0.02748 | −0.10783 | −0.34388 |
| B | 0.00000 | 0.00204 | −0.03181 | −0.06127 | 0.42716 | 0.57490 |
| C | 0.00000 | 0.00004 | 0.00490 | 0.18836 | −1.06820 | −0.88688 |
| D | 0.00000 | −0.00052 | −0.00312 | −0.68571 | 1.49742 | 1.07413 |
| E | 0.00000 | 0.00021 | 0.00000 | 1.36416 | −1.31600 | −1.06315 |
| F | 0.00000 | 0.00001 | 0.00000 | −1.58473 | 0.72148 | 0.81180 |
| G | 0.00000 | 0.00000 | 0.00000 | 1.06935 | −0.22321 | −0.40405 |
| H | 0.00000 | 0.00000 | 0.00000 | −0.38883 | 0.03042 | 0.11142 |
| J | 0.00000 | 0.00000 | 0.00000 | 0.05901 | −0.00048 | −0.01286 |

| Surface No. | S9 | S10 | S11 | S12 | S13 |
|---|---|---|---|---|---|
| K | 1.97017 | 11.14971 | 26.08853 | 0.56384 | −31.21763 |
| A | −0.07078 | 0.11384 | 2.16734 | −0.03285 | −0.07490 |
| B | −0.07814 | −0.37857 | −15.67996 | 0.04549 | 0.02544 |
| C | 0.25942 | 0.54762 | 28.89068 | −0.03728 | 0.00107 |
| D | −0.15290 | −0.43918 | 55.96717 | 0.02756 | −0.00268 |
| E | −0.02980 | 0.21513 | −341.68921 | −0.01433 | 0.00010 |
| F | 0.07880 | −0.06636 | 647.94460 | 0.00465 | 0.00024 |
| G | −0.04039 | 0.01248 | −628.39450 | −0.00089 | −0.00006 |
| H | 0.00921 | −0.00129 | 315.96649 | 0.00009 | 0.00001 |
| J | −0.00081 | 0.00006 | −65.61975 | 0.00000 | 0.00000 |

Optical characteristic values of the optical imaging systems according to the first to eighth examples are listed in Table 17.

TABLE 17

| Note | First Example | Second Example | Third Example | Fourth Example | Fifth Example | Sixth Example | Seventh Example | Eighth Example |
|---|---|---|---|---|---|---|---|---|
| f | 23.3400 | 23.6521 | 23.6151 | 23.7550 | 23.1992 | 22.5773 | 22.3178 | 22.3178 |
| f1 | 20.1566 | 19.7721 | 19.9005 | 15.9872 | 16.3130 | 16.9136 | 16.9719 | 16.9719 |
| f2 | −10.4843 | −9.6755 | −10.6143 | −13.2724 | −14.5277 | −4.2364 | −6.9476 | −6.9476 |
| f3 | 4.7808 | 4.9392 | 5.0462 | 7.0594 | 7.1697 | 4.1707 | 5.7221 | 5.7221 |
| f4 | −2.8711 | −2.9438 | −2.8971 | −455.8823 | 112.0382 | 38.2428 | 80.2776 | 80.2776 |
| f5 | | | | −2.7906 | −2.7540 | −3.4118 | −3.4699 | −3.4699 |
| TTL | 7.0000 | 6.9999 | 7.0000 | 6.9997 | 7.0000 | 6.9999 | 7.0000 | 7.0000 |
| BFL | 1.0523 | 1.0523 | 1.0523 | 1.0147 | 1.1093 | 1.1270 | 1.1418 | 1.1270 |
| f number | 3.8000 | 3.6000 | 3.6000 | 4.0500 | 4.0500 | 3.6000 | 3.6000 | 3.6000 |

TABLE 17-continued

| Note | First Example | Second Example | Third Example | Fourth Example | Fifth Example | Sixth Example | Seventh Example | Eighth Example |
|---|---|---|---|---|---|---|---|---|
| IMGHT | 2.6200 | 2.6200 | 2.6200 | 2.7200 | 2.7200 | 2.6200 | 2.6200 | 2.6200 |
| L1TL | 8.6806 | 8.6806 | 8.6806 | 8.7461 | 8.7461 | 8.5264 | 8.5264 | 8.5264 |

Conditional expression values of the optical imaging systems according to the first to eighth examples are listed in Table 18.

TABLE 18

| Conditional Expression | First Example | Second Example | Third Example | Fourth Example | Fifth Example | Sixth Example | Seventh Example | Eighth Example |
|---|---|---|---|---|---|---|---|---|
| TTL/f | 0.2999 | 0.2960 | 0.2964 | 0.2947 | 0.3017 | 0.3100 | 0.3137 | 0.3137 |
| f/f1 | 1.1579 | 1.1962 | 1.1867 | 1.4859 | 1.4221 | 1.3349 | 1.3150 | 1.3150 |
| V1 − V2 | 23.3000 | 3.1000 | 2.4000 | 25.7000 | 25.7000 | 2.0000 | 23.3000 | 2.0000 |
| Nd2 + Nd3 | 3.1490 | 3.1962 | 3.1747 | 3.1838 | 3.1747 | 3.2937 | 3.1810 | 3.2937 |
| BFL/f | 0.0451 | 0.0445 | 0.0446 | 0.0427 | 0.0478 | 0.0499 | 0.0512 | 0.0505 |
| D12/f | 0.0278 | 0.0275 | 0.0276 | 0.0274 | 0.0280 | 0.0288 | 0.0291 | 0.0291 |
| L1S1ER/L1S2ER | 5.0047 | 5.0047 | 4.9838 | 5.2303 | 5.2303 | 4.8923 | 4.8923 | 4.8923 |
| L1TL/TTL | 1.2401 | 1.2401 | 1.2401 | 1.2495 | 1.2494 | 1.2181 | 1.2181 | 1.2181 |

As described above, an optical imaging system appropriate for a high-performance small-sized camera may be implemented.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
    a total of five lenses, wherein each of the five lenses has a refractive power, and the five lenses are disposed in order from an object side to an imaging side,
    wherein among the lenses, a frontmost lens disposed to be closest to an object side has two or more reflective surfaces,
    wherein the frontmost lens has a concave image-side surface in a paraxial region,
    wherein a lens most adjacent to the frontmost lens has negative refractive power and a concave object-side surface,
    wherein among the lenses, a rearmost lens disposed to be closest to the imaging side has an inflection point formed on at least one of an object-side surface and an image-side surface,
    wherein a rear lens most adjacent to the rearmost lens has negative refractive power,
    wherein $0 < V1 - V2 < 30$, where V1 is an Abbe number of the foremost lens and V2 is an Abbe number of a lens most adjacent to the foremost lens, and
    wherein a radius of curvature of an image-side surface of a third lens among the lenses is greater than a radius of curvature of an object-side surface of the third lens.

2. The optical imaging system of claim 1, wherein the rearmost lens has a concave object-side surface.

3. The optical imaging system of claim 1, wherein the rearmost lens has a concave image-side surface.

4. The optical imaging system of claim 1, wherein the frontmost lens has positive refractive power.

5. The optical imaging system of claim 1, wherein the rearmost lens has negative refractive power.

6. The optical imaging system of claim 1, wherein:

$0.28 < TTL/f < 0.32$, where TTL is a distance from an object-side surface of the frontmost lens to an imaging plane, and f is a focal length of the optical imaging system.

7. The optical imaging system of claim 1, wherein:

$1.0 < f/f1 < 2.0$, where f is a focal length of the optical imaging system, and f1 is a focal length of the frontmost lens.

8. The optical imaging system of claim 1, wherein:

$3.30 < L1S1ER/L1S2ER < 5.80$, where L1S1ER is an effective radius of an object-side surface of the frontmost lens, and L1S2ER is an effective radius of an image-side surface of the frontmost lens.

9. An optical imaging system, comprising:
    a total of five lenses, each of which with refractive power, including a first lens having a concave image-side surface in a paraxial region, a second lens having negative refractive power and a concave object-side surface, a third lens, a fourth lens, and a fifth lens, disposed in order from an object side to an imaging side,
    wherein the first lens has a first reflective surface, configured to reflect light incident from an object-side surface of the first lens, and a second reflective surface configured to reflect the light, reflected by the first reflective surface, to an image-side surface of the first lens, wherein the fourth lens has negative refractive power, wherein 0<V1−V2<30, where V1 is an Abbe number of the first lens and V2 is an Abbe number of the second lens, and wherein a radius of curvature of an image-side surface of the third lens is greater than a radius of curvature of an object-side surface of the third lens.

10. The optical imaging system of claim 9, wherein the first lens has positive refractive power.

11. The optical imaging system of claim 9, wherein the third lens has positive refractive index.

12. The optical imaging system of claim 9, wherein:

0.28<*TTL/f*<0.32, where TTL is a distance from an object-side surface of the first lens to an imaging plane, and f is a focal length of the optical imaging system.

13. The optical imaging system of claim 9, wherein the fifth lens is disposed to an image side of the fourth lens.

14. The optical imaging system of claim 13, wherein the fifth lens has negative refractive power.

15. The optical imaging system of claim 13, wherein an inflection point is formed on an object-side surface or an image-side surface of the fifth lens.

16. The optical imaging system of claim 9, wherein 1.1<L1TL/TTL<1.3, where L1TL is a sum of a distance from the object-side surface of the first lens to the first reflective surface, a distance from the first reflective surface to the second reflective surface, and a distance from the second reflective surface to the imaging plane of the optical imaging system, and TTL is a distance from the object-side surface of the first lens to an imaging plane.

* * * * *